(12) United States Patent
Frankel et al.

(10) Patent No.: US 8,655,759 B2
(45) Date of Patent: Feb. 18, 2014

(54) CONTROLLING A SHARED SERVICE

(75) Inventors: Bruce Frankel, Marlton, NJ (US); Lior Auslander, Voorhees, NJ (US); Pankaj Trivedi, Voorhees, NJ (US); David Policar, Woburn, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 13/266,102

(22) PCT Filed: Apr. 30, 2009

(86) PCT No.: PCT/US2009/002650
§ 371 (c)(1),
(2), (4) Date: Oct. 24, 2011

(87) PCT Pub. No.: WO2010/126466
PCT Pub. Date: Nov. 4, 2010

(65) Prior Publication Data
US 2012/0047057 A1    Feb. 23, 2012

(51) Int. Cl.
*G06Q 40/00* (2012.01)
(52) U.S. Cl.
USPC .......... 705/35; 705/38; 705/39; 705/40; 705/41; 705/42; 705/43; 705/44; 705/45
(58) Field of Classification Search
USPC .................................... 705/35–45
See application file for complete search history.

(56) References Cited

U.S. PATENT DOCUMENTS

| | | | |
|---|---|---|---|
| 7,249,092 B2 * | 7/2007 | Dunn et al. | 705/38 |
| 8,060,424 B2 * | 11/2011 | Kasower | 705/35 |
| 2002/0103762 A1 | 8/2002 | Lopez et al. | |
| 2004/0039694 A1 * | 2/2004 | Dunn et al. | 705/39 |
| 2004/0078332 A1 * | 4/2004 | Ferguson et al. | 705/41 |
| 2004/0143527 A1 * | 7/2004 | Benkert et al. | 705/35 |
| 2006/0015421 A1 | 1/2006 | Grimberg | |
| 2006/0151598 A1 * | 7/2006 | Chen et al. | 235/380 |

(Continued)

FOREIGN PATENT DOCUMENTS

| | | |
|---|---|---|
| EP | 1475947 A1 | 11/2004 |
| WO | 01/06753 A1 | 1/2001 |
| WO | 2007/140007 A2 | 12/2007 |

OTHER PUBLICATIONS

European Search Report dated Oct. 26, 2012 for corresponding European Patent Application No. 09844129.8.

(Continued)

*Primary Examiner* — Narayanswamy Subramanian
(74) *Attorney, Agent, or Firm* — Ohlandt, Greeley, Ruggiero & Perle, L.L.P.

(57) ABSTRACT

A method includes determining whether a first amount of liability contributed by a first subscriber during a provision of a service to the first subscriber exceeds a first balance indicative of a first portion of available funding that may be consumed by the first subscriber, determining whether a second amount of liability contributed by a second subscriber during a provision of a service to the second subscriber exceeds a second balance indicative of a second portion of the available funding that may be consumed by the second subscriber, issuing a first communication to a device to affect the provision of a service to the first subscriber if the first amount of liability exceeds the first balance, and issuing a second communication to the device to affect the provision of a service to the second subscriber if the second amount of liability exceeds the second balance.

12 Claims, 12 Drawing Sheets

(56) References Cited

U.S. PATENT DOCUMENTS

2007/0179906 A1    8/2007    Frankel et al.
2008/0119162 A1    5/2008    Sivalingam et al.
2009/0043663 A1*   2/2009    Prater ............................. 705/16
2010/0114747 A1*   5/2010    Kasower ......................... 705/35

OTHER PUBLICATIONS

International Search Report and Written Opinion dated Jul. 2, 2009 for corresponding International Patent Application No. PCT/US2009/002650.

International Preliminary Report on Patentability dated Mar. 5, 2012 for corresponding International Patent Application No. PCT/US2009/002650.

Russian Office Action dated Mar. 4, 2013 for corresponding Russian Patent Application No. 2011148505 with English translation (9 pages).

First Office Action dated Jun. 5, 2013 for corresponding Chinese patent application No. 200980160160.X with English translation, pp. 20.

* cited by examiner

CONTROLLING A SHARED SERVICE

BACKGROUND OF THE INVENTION

1. Field of the Invention

The present disclosure relates to a technique for controlling usage of a shared service, such a mobile telephone service being provided to a group of subscribers or group of accounts in real time.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Service providers, for example, a service provider for mobile telephone communication, may provide plans or packages that include a service for more than one user so that the users share an account or more than one account established by the plan. The accounts may include a sum of minutes shared by the users during use of their phones. However, the service provider incurs risk when providing the service to accounts and subscribers of accounts without pre-payment such as possible losses due to non-payment. This risk increases with each additional user and account due to the increase in usage of the service. Moreover, users may desire service providers limit use of the service in order to decrease cost. Accordingly, service providers have a necessity for control.

The present document discloses a technique for controlling usage of a service by more than one subscriber or account.

SUMMARY OF THE INVENTION

A method includes obtaining a liability limit indicative of an available funding, determining whether a first amount of liability contributed by a first subscriber during a provision of a service to the first subscriber exceeds a first balance indicative of a first portion of the available funding that may be consumed by the first subscriber, determining whether a second amount of liability contributed by a second subscriber during a provision of a service to the second subscriber exceeds a second balance indicative of a second portion of the available funding that may be consumed by the second subscriber, issuing a first communication to a device to affect the provision of a service to the first subscriber if the first amount of liability exceeds the first balance, and issuing a second communication to the device to affect the provision of a service to the second subscriber if the second amount of liability exceeds the second balance.

A method includes obtaining a hierarchy of a first account having a first subscriber and a second account having a second subscriber, the second account being lower in the hierarchy than the first account, obtaining (a) a first liability limit indicative of a first available funding to the first account, and (b) a second liability limit indicative of a second available funding to the second account, maintaining a first running total that includes a sum of (a) a first amount of liability contributed by the first subscriber during a provision of a service to the first subscriber, and (b) a second amount of liability contributed by the second subscriber during a provision of a service to the second subscriber, determining whether the first running total exceeds the first liability limit, issuing a first communication to a device to affect the provision of a service to the first subscriber and the provision of a service to the second subscriber, if the first running total exceeds the first liability limit.

BRIEF DESCRIPTION OF THE DRAWINGS

A component or a feature that is common to more than one drawing is indicated with the same reference number in each of the drawings.

DESCRIPTION OF THE INVENTION

Figure 1:
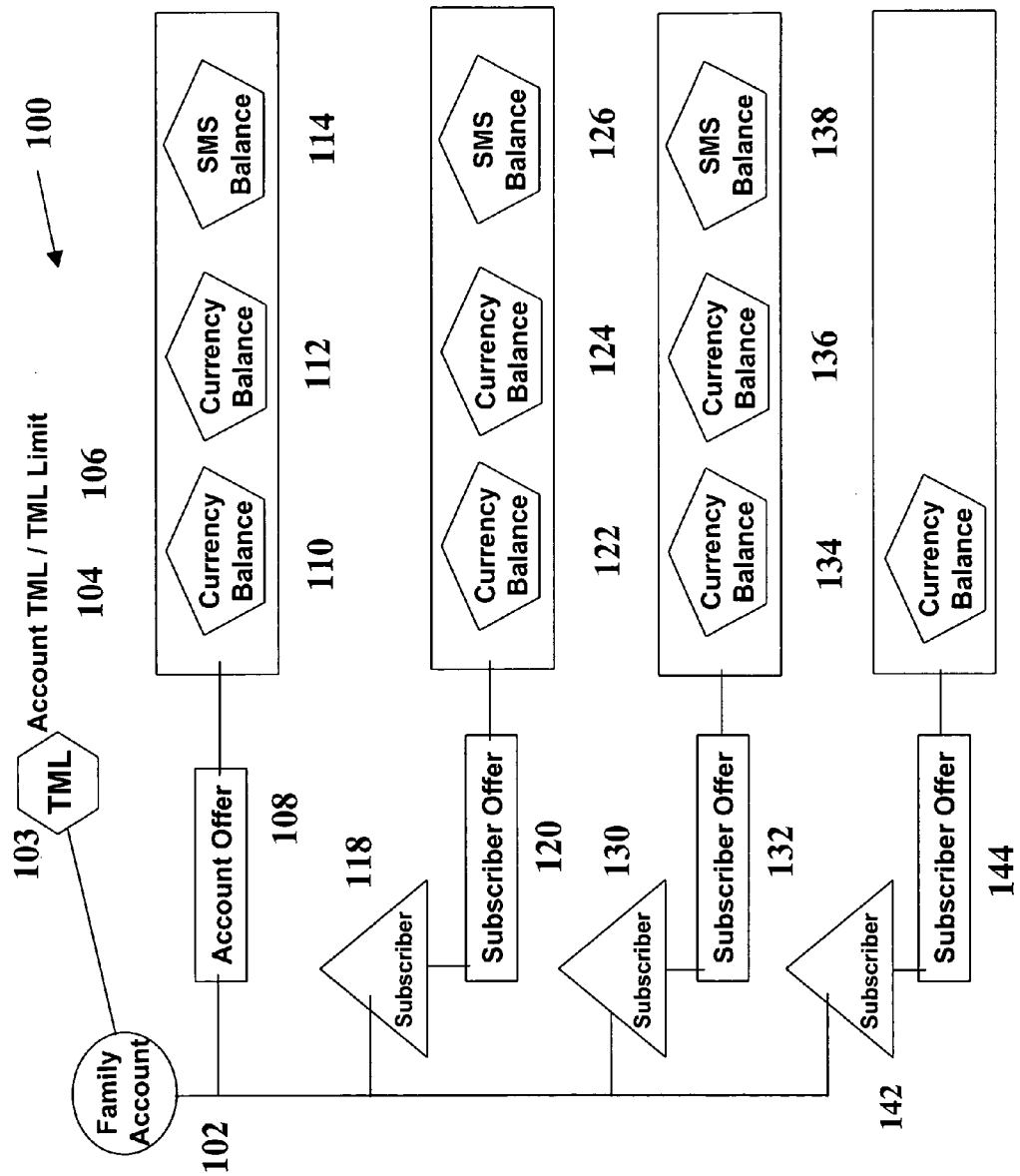
FIG. 1 is a block diagram of a sample configuration of an account structure.

The present description introduces a concept referred to herein as a "total monetary liability." Total monetary liability is a specific type of sum defined for controlling consumption of funds from another source. Funds include monetary sums, goods and services. Services may include goods and/or services. In more detail, total monetary liability includes a running total of a sum of an amount of liability or funds consumed. The running total has a value that reflects debits to the account, increasing the total monetary liability, and credits to the account, decreasing the total monetary liability.

The present description also introduces a concept referred to herein as a "total monetary liability limit." The total monetary liability limit is a value of the running total. The total monetary liability limit may be a maximum financial exposure that a source is willing to extend to an account.

At the end of the present description, there is a table, namely Table 3, which contains definitions of some other terms.

A source such as a provider of service incurs risk when providing funds to accounts and subscribers of accounts without pre-payment such as possible losses due to non-payment. This risk is increased where there is more than one subscriber of an account or more than one account in a hierarchy due to increased use of the service. A total monetary liability system ("TML system") provided herein obtains a total monetary liability limit for an account that is indicative of an available amount of funding predetermined by the source or service provider. The TML system maintains a total monetary liability that is a running total for an amount of liability contributed by subscribers of each account or accounts within a defined scope. The TML system determines whether the total monetary liability exceeds the total monetary liability limit in order to notify the source or subscribers. If the total monetary liability exceeds the total monetary liability limit a communication may be issued to affect the provision of a service to the subscriber. The communication issued may affect the provision of a service in order to notify the subscriber or terminate usage of the service. The term "exceed", as used herein, includes reaching or exceeding.

The TML system may also determine an available total monetary liability ("available TML") that equals an amount of a total monetary liability below a total monetary limit. The available TML is indicative of a portion of an available funding that may be consumed by a subscriber or account prior to the total monetary liability exceeding the total monetary liability limit. A communication of the available TML may be issued, for example, to a network, indicating that usage of funds can only be allowed for an amount of time that corresponds to the available TML, or indicating that the subscriber or account can only consume up to an amount that corresponds to the available TML, and the network is obligated to terminate usage of funds when this amount, for example, consumption level, is reached.

An amount of liability contributed by each subscriber during a provision of a service to each subscriber may be determined to exceed a balance that is indicative of a portion of the available funding that may be consumed by each subscriber. If the amount of liability of one of the subscribers exceeds the balance that is indicative of the portion of the available funding that may be consumed by the subscriber, a communication to a device to affect the provision of a service to the subscriber is issued. As above, the affect of the provision of a service may be issued in order to notify the subscriber or terminate usage of the service.

Thus, the TML system maintains, in real time, the total monetary liability and determines an available TML or if the total monetary liability exceeds a total monetary liability limit during consumption of the funds so that action may be taken as soon as the total monetary liability exceeds a total monetary liability limit. By using a current up-to-date value of the total monetary liability, as well as the total monetary liability limit, for example, when used with on-line authorization and charging for usage, a merchant or service provider can inhibit further usage of an account, including usage by any and all members or subscribers of the account once the total monetary liability limit has been reached. The restrictions can be relaxed, for example, when the total monetary liability has either been reduced by credit to the account (e.g. payment), or the merchant agrees to increase the account's total monetary liability limit.

Referring to FIG. 1, an account structure 100 has an account 102 that contains a TML system 103 that obtains a total monetary liability limit 106 and maintains overall total monetary liability 104 of account 102.

Account 102 has a single account offer 108, which in turn establishes three account balances 110, 112, and 114. The three account balances 110, 112, and 114 are available for use to pay for goods and services for all subscribers of account 102, including subscribers 118, 130, and 142. The account offer 108 also dictates charges and terms of usage for account 102.

Account 102 has subscriber 118 that is a member of account 102. Subscriber 118 has a subscriber offer 120, which dictates the terms, conditions, and rates for usage by subscriber 118. Subscriber offer 120 also establishes subscriber balances 122, 124, and 126. Subscriber balances 122, 124, and 126 are available to be used to pay for goods and services by subscriber 118 only.

Account 102 has subscriber 130 that is a member of account 102. Subscriber 130 has a subscriber offer 132, which dictates the terms, conditions, and rates for usage by subscriber 130. Subscriber offer 132 also establishes subscriber balances 134, 136, and 138. Subscriber balances 134, 136, and 138 are available to be used to pay for goods and services by subscriber 130 only. Subscriber offer 120 and subscriber offer 132 are the same, however, subscriber offer 120 and subscriber offer 132 may be different.

Account 102 has subscriber 142 that is a member of account 102. Subscriber 142 has a subscriber offer 144, which dictates the terms, conditions, and rates for usage by subscriber 142. This offer also establishes subscriber balance 146. Subscriber balance 146 is available to be used to pay for goods and services by subscriber 142 only.

Total monetary liability 104 reflects a liability of account 102. Total monetary liability 104 is affected by, and affects use of all currency balances within account 102, including subscriber balances 110, 112, 122, 124, 134, 136, 146. Account balance 114 and subscriber balances 126 and 138 are non-currency balances. Non-currency balances, such as short message services (SMS), may not affect, nor are they affected by total monetary liability 104. For example, a plan may be purchased from a service provider that for $10 provides 500 SMSs per month, with any overage charged at $0.10 per SMS. The $10 charge for the plan would be applied to total monetary liability. Each month would be started with the SMS balance set to 500, and the $10 applied to the total monetary liability. As each of the first 500 SMSs is used and charged, the SMS balance would be decremented by one, however the total monetary liability would not be affected, because the $10 for the monthly allotment. When the user does an SMS beyond the initial 500, the SMS balance would be 0, so $0.10 would be charged. This $0.10 charge would be applied to the total monetary liability. Accordingly, the total monetary liability may be only affected by currency changes.

Each subscriber is limited by their available balances. For example, subscriber 118 is limited by balances 122, 124 and 126, subscriber 130 is limited by balances 134, 136 and 138 and subscriber 142 is limited by balance 146. Additionally, each subscriber is limited by the account total monetary liability limit, for example, subscribers 118, 130 and 142 are limited by total monetary liability limit 106. These are essentially independent, parallel checks or limits that are applied.

Total monetary liability 104 is a sum of liability, for example, through use of goods and services, contributed by account 102 and subscribers 118, 130 and 142. TML system maintains total monetary liability 104 and determines when total liability 104 exceeds total monetary liability 106. In addition, TML system may also determine an available TML that equals an amount of total monetary liability 104 below total monetary limit 106. The available TML is indicative of a portion of an available funding that may be consumed by account 102 and subscribers 118, 130 and 142 prior to total monetary liability 104 exceeding total monetary liability limit 106.

Figure 2:
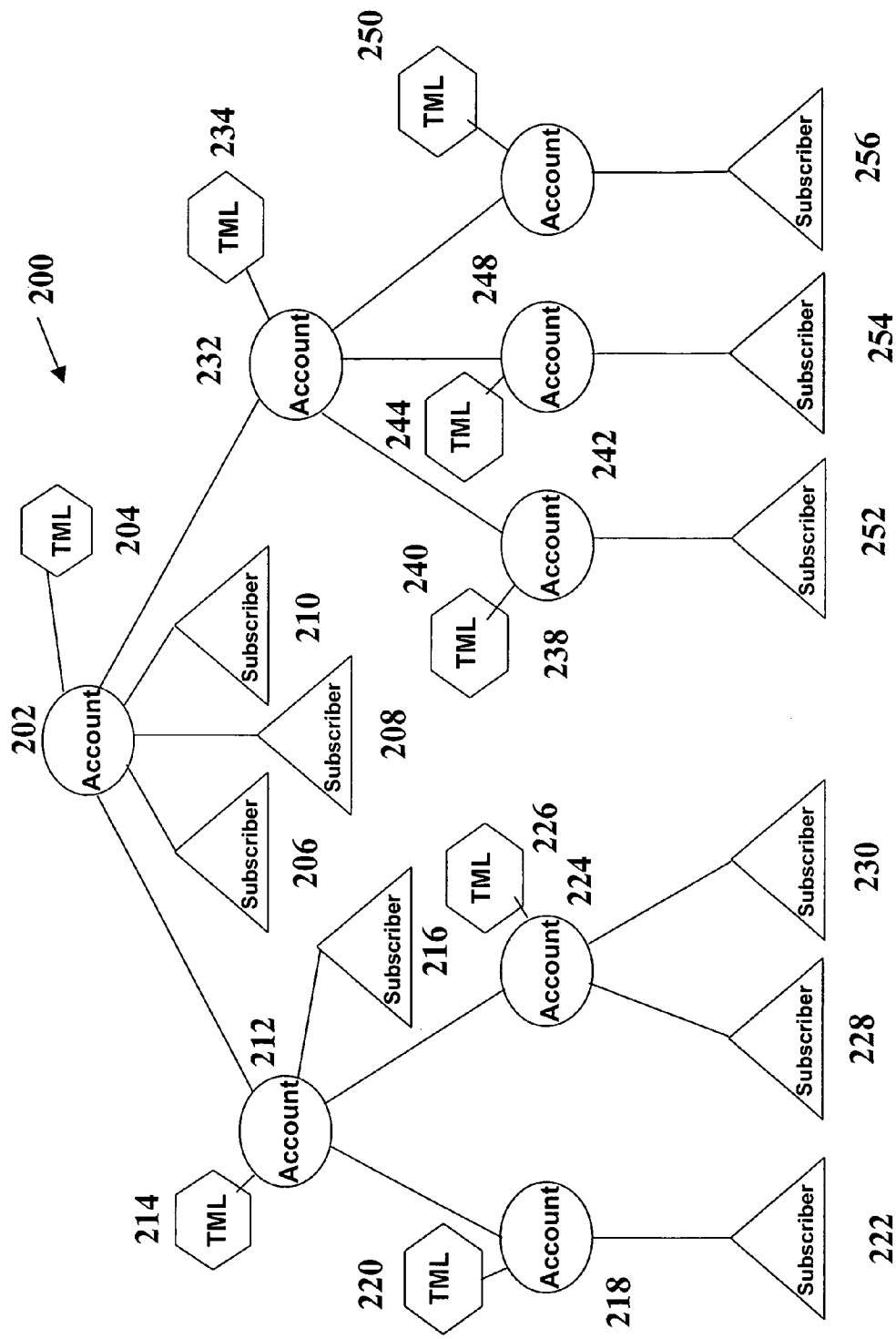
FIG. 2 is a block diagram of a sample configuration of an account structure.

Referring to FIG. 2, an account structure including an account hierarchy configuration 200 has a more complex, hierarchical structure than configuration 100, including accounts 212, 218, 224, 232, 238, 242, and 248 that are sub accounts, or lower on the hierarchy, than account 202. This becomes important when it comes to a scope of TML systems 204, 214, 220, 226, 234, 240, 244, and 250.

Figure 3:
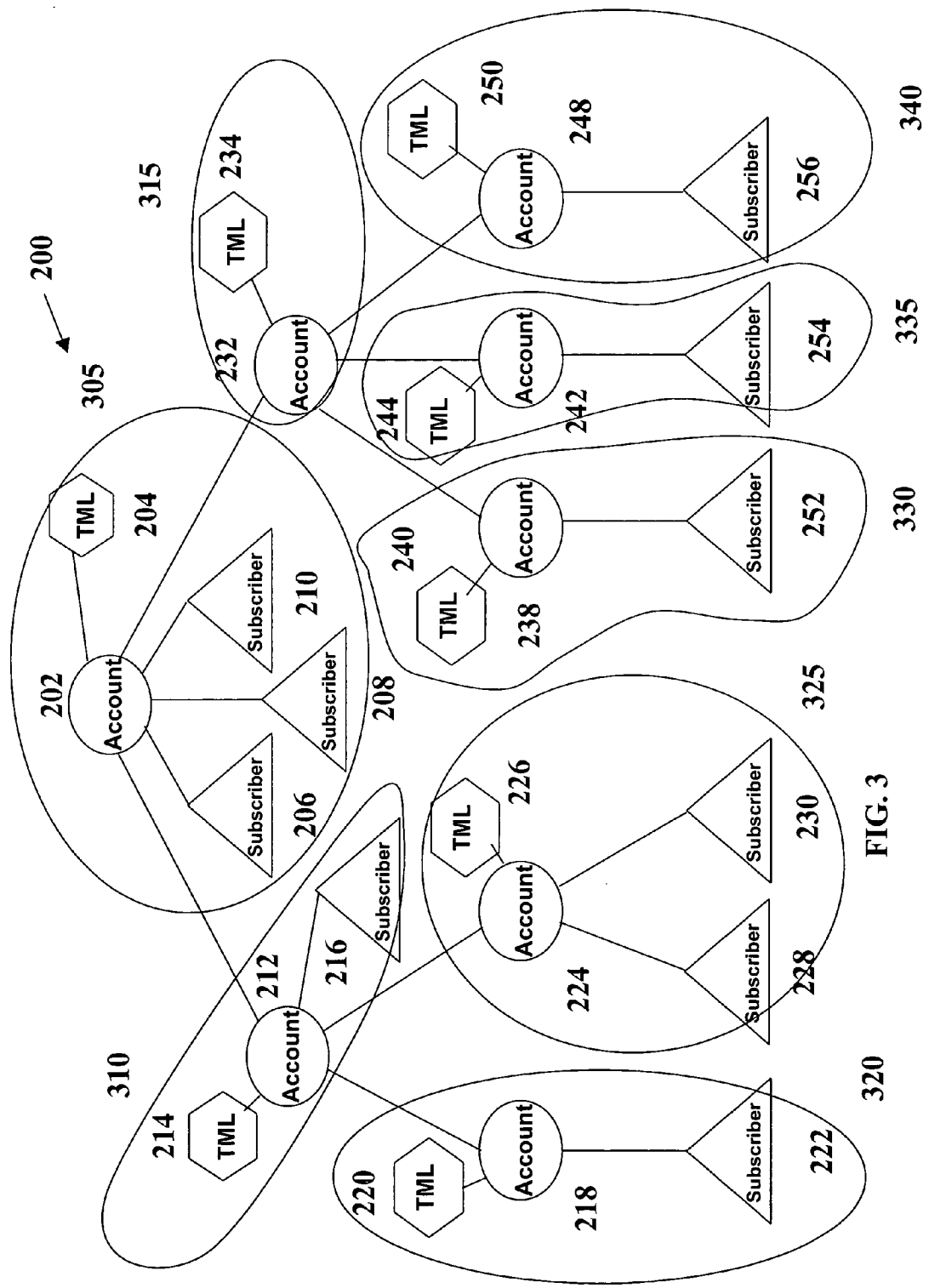
FIG. 3 is a block diagram of the configuration of FIG. 2 having scopes.

Referring to FIG. 3, configuration 200 has scopes 305, 310, 315, 320, 325, 330, 335, and 340. By default, a scope of a TML system having a total monetary liability and a total monetary liability limit is an account and all subscribers directly associated to the account. Scope 305 of TML system 204 includes account 202 and subscribers 206, 208, and 210. Scope 310 of TML system 214 includes account 212 and subscriber 216. Scope 315 of TML system 234 includes account 232. Scope 320 of TML system 220 includes account 218 and subscriber 222. Scope 325 of TML system 226 includes account 224 and subscribers 228 and 230. Scope 330 of TML system 240 includes account 238 and subscriber 252. Scope 335 of TML system 244 includes account 242 and subscriber 254. Scope 340 of TML system 250 includes account 248 and subscriber 256. There is no overlap of TML systems 204, 234, 220, 226, 240, 244 and 250.

Accordingly, the total monetary liability of each account includes a sum of liability contributed by the account and all subscribers directly associated to the account. The TML system of each account determines when the total monetary liability exceeds the total monetary liability limit of the TML system. For example, TML system 204 has a total monetary liability that maintains a sum of liability contributed by account 202 and subscribers 206, 208 and 210 and determines when the total monetary liability exceeds the total liability limit of TML system 204.

Figure 4:
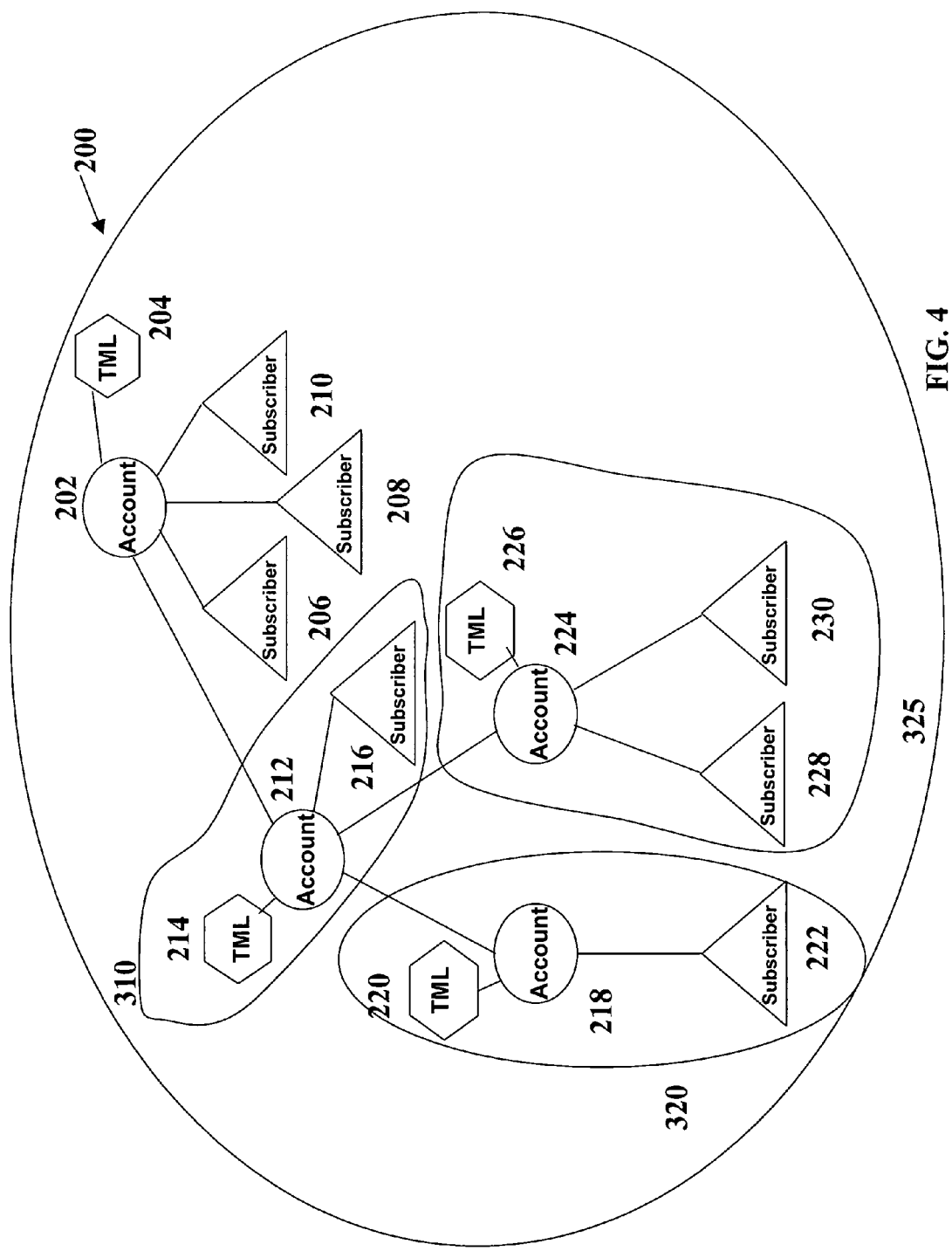
FIG. 4 is a block diagram of a portion of the configuration of FIG. 2 having scopes.

FIG. 4 shows a portion of configuration 200 having scopes 310, 320, 325 and 405. Scope 405 of TML system 204 is extended to include the entire hierarchy, including accounts 202, 212, 218 and 224 and subscribers 206, 208, 210, 216, 222, 228 and 230 within the hierarchy. TML system 204 overlaps TML systems 214, 220 and 226. Accordingly, the total monetary liability of TML system 204 includes a sum of liability contributed by accounts 202, 212, 218 and 224 and subscribers 206, 208, 210, 216, 222, 228 and 230, for example, through use of goods and services. TML system 204 determines when the total monetary liability exceeds the total monetary liability limit of TML system 204. The TML system may take action, for example, by issuing a communication, as soon as the total monetary liability exceeds the total monetary liability limit of TML system 204.

In addition, as discussed above, scope 310 of TML system 214 covers liability directly associated to account 212, as well as that of single subscriber 216 directly associated to account 212. Accordingly, the total monetary liability of TML system 214 maintains a sum of liability contributed by account 212 and subscriber 216 and determines when the total monetary liability exceeds the total monetary liability limit of TML system 214. Scope 320 of TML system 220 covers liability directly associated to account 218, as well as that of single subscriber 222 directly associated to account 220. Accordingly, the total monetary liability of TML system 220 maintains a sum of liability contributed by account 218 and subscriber 222 and determines when the total monetary liability exceeds the total monetary liability limit of TML system 220. Scope 325 of TML system 226 covers liability directly associated to account 224, as well as that of subscribers 228 and 230 directly associated to account 224. Accordingly, the total monetary liability of TML system 226 maintains a sum of liability contributed by account 224 and subscribers 228 and 230 and determines when the total monetary liability exceeds the total monetary liability limit of TML system 226.

The TML system of each scope has an available TML that equals an amount of the total monetary liability below the total monetary limit. When the total monetary liability exceeds the total monetary limit there is no more available TML or the available TML equals zero. A subscriber may be within more than one scope. The minimum of the available TMLs of the scopes that the subscriber or account is within limits subscriber or account, as will be further described in an example of Table 2. In addition, when the total monetary liabilities exceeds the total monetary liability limits of any of the scopes the account or subscriber is within, a communication may be issued to affect the provision of a service to subscriber or account.

For example, subscriber 216 is within scope 310 and 405. TML system 204 has an available TML that equals an amount of total monetary liability below the total monetary liability limit of TML system 204. TML system 214 has an available TML that equals an amount of total monetary liability below the total monetary liability limit of TML system 214. The minimum available TML of scopes 405 and 310 limits subscriber 216 so that subscriber 216 may not use funds that exceed the minimum available TML prior to one of the total monetary liabilities exceeding one of the total monetary liability limits of one of the TML systems.

In contrast, an account or subscriber in a single scope is limited by an available TML of the single scope. For example, subscriber 206 is only within scope 405. An available TML of scope 405 is an amount of total monetary liability below the total monetary liability limit of TML system 204. Subscriber 206, and/or subscribers 208 and 210, may use funds equal to the available TML of TML system 204 prior to the total monetary liability exceeding the total monetary liability limit of TML system 204.

Figure 5:
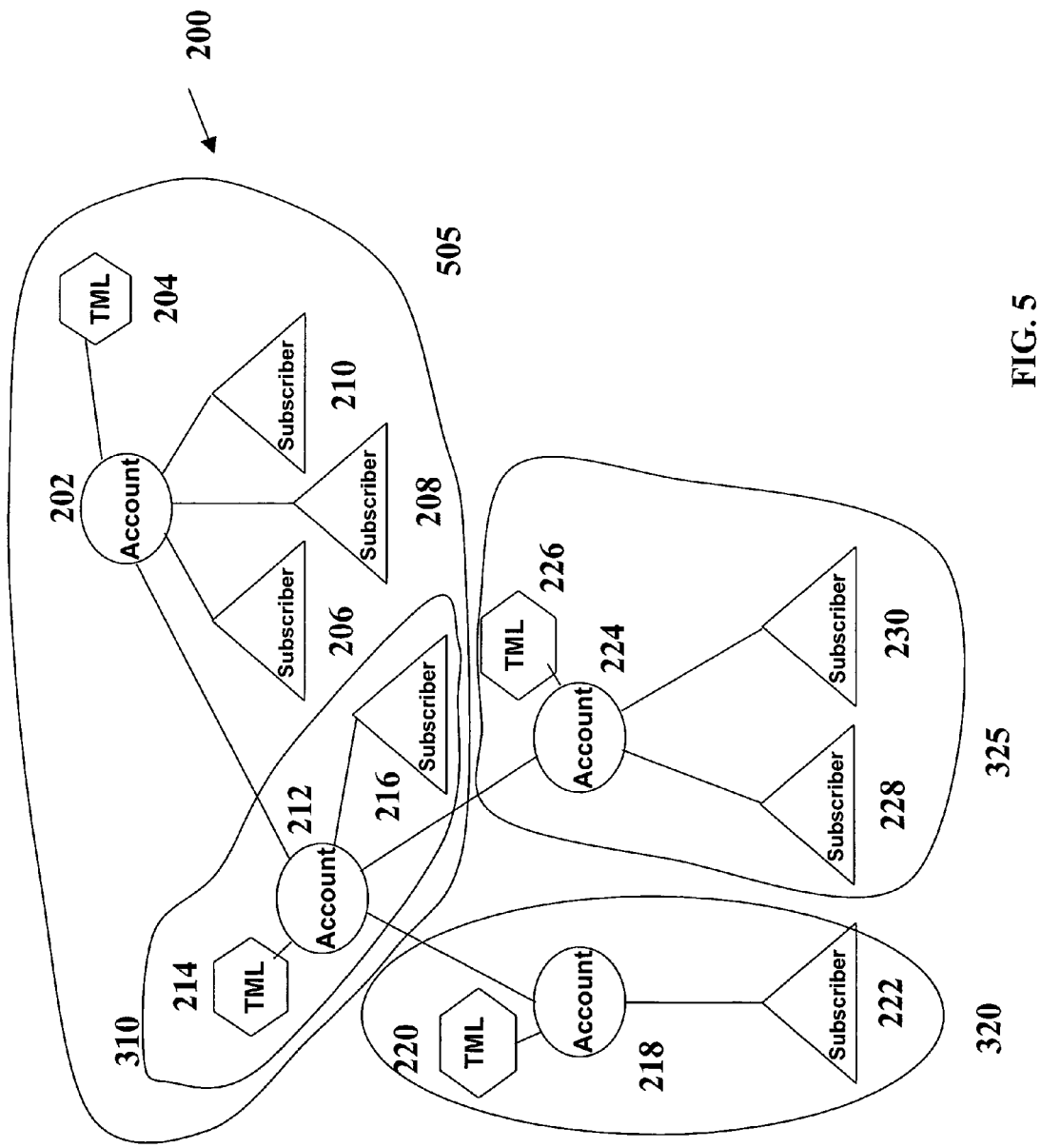
FIG. 5 is a block diagram of a portion of the configuration of FIG. 2 having scopes.

FIG. 5 is a portion of configuration 200 having scopes 310, 320, 325 and 505. Scope 505 of TML system 204 is extended to include account 212 so that TML system 204 overlaps TML system 214. Accordingly, account 212 and subscriber 216 are within scopes 310 and 505. TML system 204 has a total monetary liability that maintains a sum of liability contributed by accounts 202 and 212 and subscribers 206, 208, 210 and 216 and determines when the total monetary liability exceeds the total monetary liability limit of TML system 204. TML system 214 has a total monetary liability that maintains a sum of liability contributed by account 212 and subscriber 216 and determines when the total monetary liability exceeds the total monetary liability limit of TML system 214.

TML system 204 has an available TML that equals an amount of total monetary liability below the total monetary liability limit of TML system 204. TML system 214 has an available TML that equals an amount of total monetary liability below the total monetary liability limit of TML system 214. The minimum available TML of scopes 505 and 310 limits subscriber 216 so that subscriber 216 may not use funds that exceed the minimum available TML prior to one of the total monetary liabilities exceeding one of the total monetary liability limits of one of the TML systems.

In contrast, an account or subscriber in a single scope is limited by an available TML of the single scope. For example, subscriber 206 is only within scope 505. An available TML of scope 505 is an amount of total monetary liability below the total monetary liability limit of TML system 204. Subscriber 206 may not use funds that exceed the available TML prior to the total monetary liability exceeding the total monetary liability limit. In addition, accounts 218 and 224 maintain independent TML systems 220 and 226 so that scopes 320 and 325 are similar to FIG. 3.

Figure 6:
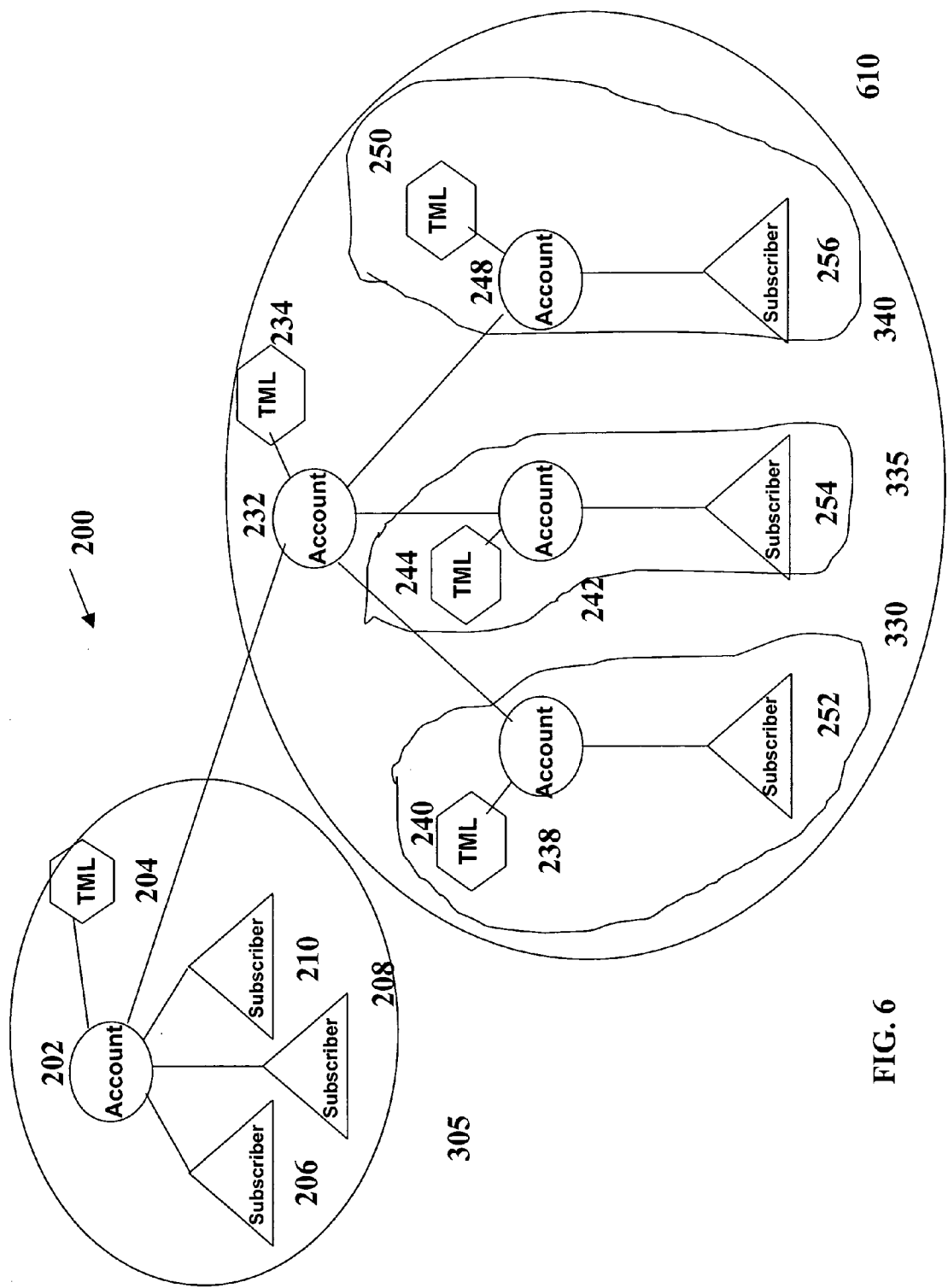
FIG. 6 is a block diagram of a portion of the configuration of FIG. 2 having scopes.

FIG. 6 is a portion of configuration 200 having scopes 305, 330, 335, 340 and 610. Scope 305 is similar to FIG. 3.

Scope 610 of TML system 234 covers accounts 232, 238, 242 and 248 and overlaps TML systems 240, 244, and 250. Accordingly, the total monetary liability of TML system 234 includes liability contributed by accounts 232, 238, 242 and 248 and subscribers 252, 254 and 256. TML system 234 has an available TML that equals an amount of the total monetary liability below the total monetary liability limit of TML system 234. Scope 330 of TML system 240 includes account 238 and subscriber 252 and the total monetary liability of TML system 240 includes liability contributed by account 238 and subscriber 252. TML system 240 has an available TML that equals an amount of the total monetary liability below the total monetary liability limit of TML system 240. Scope 335 of TML system 244 includes account 242 and subscriber 254 and the total monetary liability of TML system 244 includes liability contributed by account 242 and subscriber 254. TML system 234 has an available TML that equals an amount of the total monetary liability below the total monetary liability limit of TML system 244. Scope 340 of TML system 250 includes account 248 and subscriber 256 and the total monetary liability of TML system 250 includes liability contributed by account 248 and subscriber 256. TML system 250 has an available TML that equals an amount of the total monetary liability below the total monetary liability limit of TML system 234. The minimum available TML of each of the scopes an account or subscriber is within, limits the account or subscriber so that the account or subscriber may not use funds that exceed the minimum available TML prior to one of the total monetary liabilities exceeding one of the total monetary liability limits of one of the TML systems.

Referring to FIGS. 1-6, if a total monetary liability exceeds a total monetary liability limit or when a subscriber exceeds their balances a communication may be issued to affect the provision of a service to the subscribers or source or service providers. The affect of the provision of a service may be issued in order to notify the service provider or subscribers or terminate usage of the goods and services.

A communication of the available TML may be issued, for example, to a network, indicating that goods and services can only be allowed for an amount of time that corresponds to the available TML. A communication of the available TML may be issued, for example, to indicate that subscribers, prior to the total monetary liability exceeding the total monetary liability limit, can only consume up to an amount that corresponds to the available TML so that the network is obligated to terminate service when this amount, for example, consumption level, is reached.

The TML system can limit availability of liability, or all postpaid currency balances, across an account, including account balances and subscriber balances so that the total monetary liability does not exceed the total monetary liability limit as will be further described in the examples below with reference to FIGS. 7 and 8.

Figure 7:
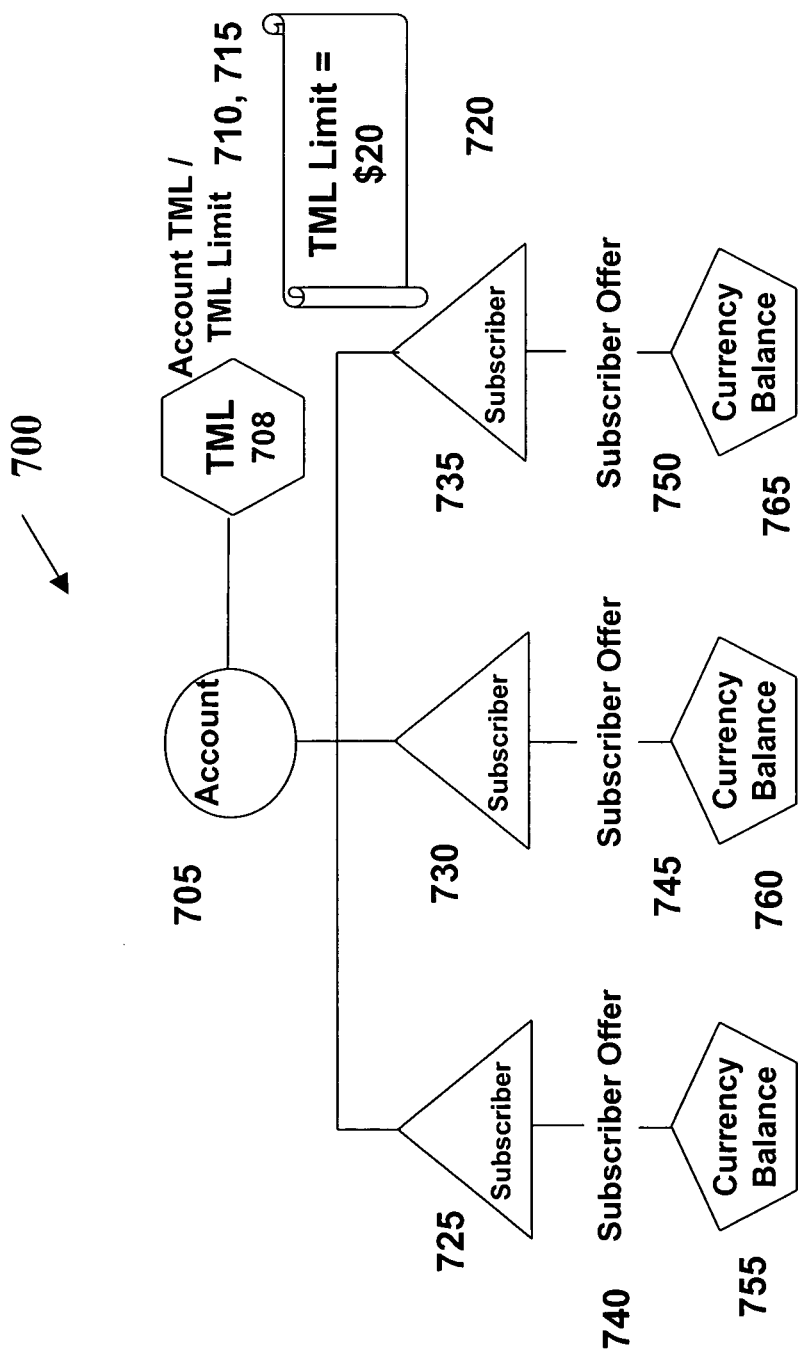
FIG. 7 is a block diagram of a sample configuration of an account structure.

FIG. 7 is a sample configuration of an account structure, designated as configuration 700. An account 705 has a TML system 708 and subscribers 725, 730 and 735. TML system 708 has a total monetary liability 710 and a total monetary liability limit 715.

Subscriber 725 has a subscriber offer 740, which dictates the terms, conditions, and rates for usage by subscriber 725. Subscriber offer 740 also establishes subscriber balance 755. Subscriber balance 755 is available to be used to pay for goods and services by subscriber 725 only. Subscriber 730 has a subscriber offer 745, which dictates the terms, conditions, and rates for usage by subscriber 730. Subscriber offer 745 also establishes subscriber balance 760. Subscriber balance 760 is available to be used to pay for goods and services by subscriber 760 only. Subscriber 735 has a subscriber offer 750, which dictates the terms, conditions, and rates for usage by subscriber 735. Subscriber offer 750 also establishes subscriber balance 765. Subscriber balance 765 is available to be used to pay for goods and services by subscriber 735 only.

Below is an example of configuration 700 described in the context of a mobile telephone communication service, the techniques described herein are not limited as such, but instead could be employed in the context of other services, such as a data communication service. Another exemplary service is a credit service, for example, a two members of a sales department each having a credit card with an individual balance, and a total monetary liability. Accordingly, for an attempted credit transaction, TML system similar to TML system 708 would be employed to control a device to permit, deny or otherwise limit the transaction.

TABLE 1

Affect on Balances 755, 760, 765 and Total Monetary Liability 710 by usage charges, and limit by Total Monetary Liability limit of availability of Balances 755, 760, 765

| # | Event | Total Monetary Liability 710 | | Balance 755 | | Balance 760 | | Balance 765 | |
|---|---|---|---|---|---|---|---|---|---|
| | | Value | Available | Value | Available | Value | Available | Value | Available |
| 1 | Starting conditions | 0 | 20 | 20 | 20 | 20 | 20 | 10 | 10 |
| 2 | Subscriber 725 makes a 60-second voice call, with charge of $8 | 8 | 12 | 12 | 12 | 20 | 12 | 10 | 10 |
| 3 | Subscriber 730 purchases an MP3 audio file, with charge of $6 | 14 | 6 | 12 | 6 | 14 | 6 | 10 | 6 |
| 4 | Subscriber 735 makes a call that is charged $1 per minute. However, since he only has $6 available, the call is limited to 6-minutes | 20 | 0 | 12 | 0 | 14 | 0 | 4 | 0 |

TABLE 1-continued

Affect on Balances 755, 760, 765 and Total Monetary Liability 710 by usage charges, and limit by Total Monetary Liability limit of availability of Balances 755, 760, 765

| # | Event | Total Monetary Liability 710 | | Balance 755 | | Balance 760 | | Balance 765 | |
|---|---|---|---|---|---|---|---|---|---|
| | | Value | Available | Value | Available | Value | Available | Value | Available |
| 5 | Subscriber 725 attempts to make a call. However, because TML has reached TML Maximum, no more funds are available, and the usage is not allowed | 20 | 0 | 12 | 0 | 14 | 0 | 4 | 0 |
| 6 | Subscriber 730 makes a $10 payment to the account, thereby decreasing the TML value by $10, and allowing further usage | 10 | 10 | 12 | 10 | 14 | 10 | 4 | 4 |

Account 705 has total monetary liability 710 with a total monetary liability limit 715 of $20. Row 1 represents the starting conditions. Row 2 represents when subscriber 725 performs a usage which is charged $8, the usage reduces balance 755 by $8, and increase total monetary liability 710 by $8. Row 3 represents when subscriber 730 makes a $6 purchase that reduces balance 760 by $6, and increases total monetary liability 710 by $6. Note that total monetary liability 710 now only has $6 available, which effectively reduces the availability of balances 755, 760 and 765 to $6, because an available amount in total monetary liability 710 is less than an available amount in balances 755, 760 and 765. Row 4 represents when subscriber 735 makes a call, because account 705 only has $6 of available credit, the call is terminated after 6-minutes, when total monetary liability 710 reaches total monetary liability limit 715. Account 705, and subscribers 725, 730 and 735 of account 705, are now unable to do anything that would require use of funds. Row 5 represents when subscriber 725 attempts to make a call, it is rejected, due to lack of funds. Note that call attempts by subscribers 730 and 735 would also be rejected. Row 6 represents when subscriber 730 makes a $10 payment, running total monetary liability 710 is reduced by $10, thereby allowing $10 of future charges for subscribers 725, 730 and 735 of account 705.

Figure 8:
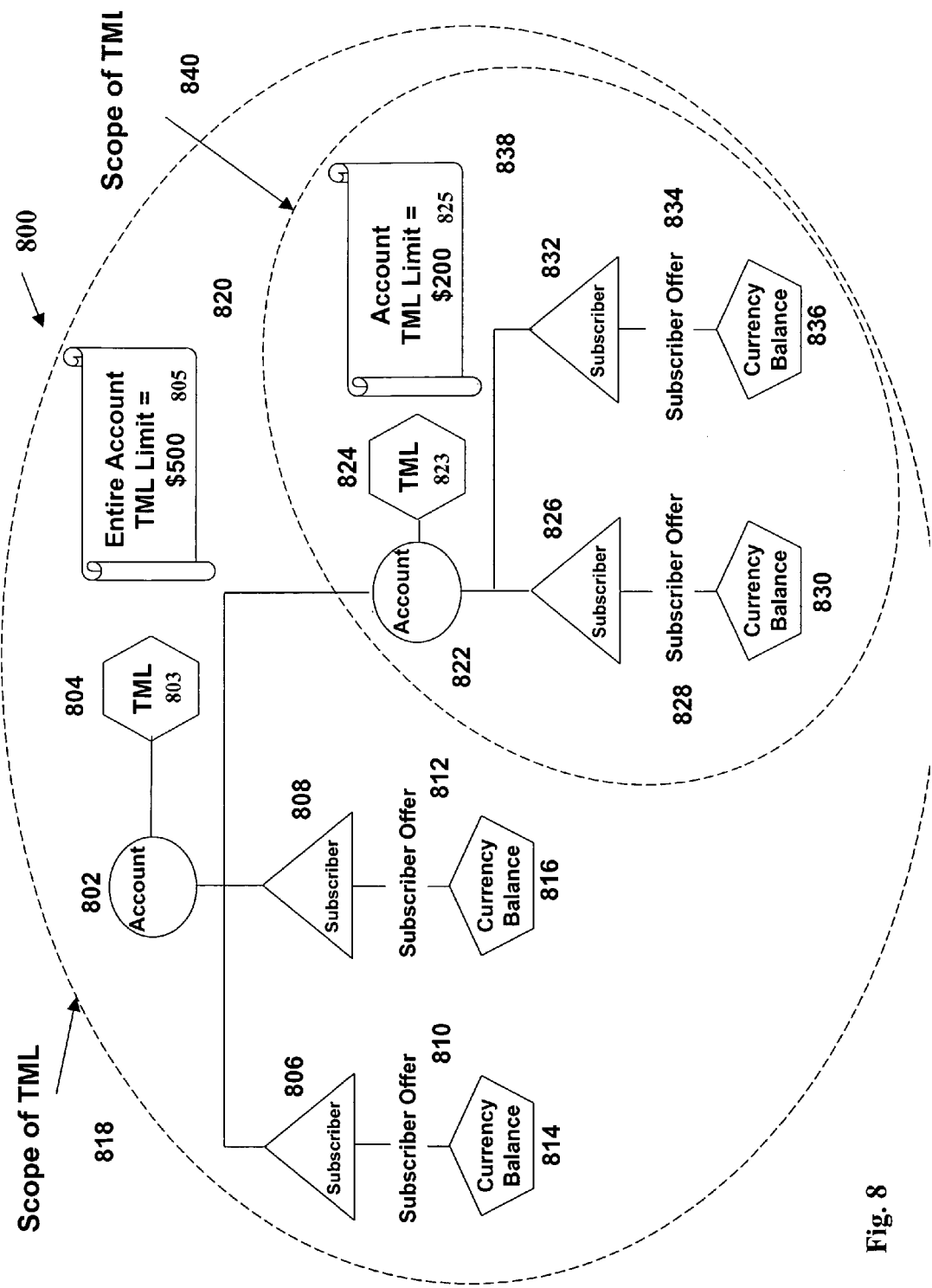
FIG. 8 is a block diagram of a sample configuration of an account structure.

FIG. 8 is a sample configuration of an account structure, designated as configuration 800. Configuration has account 802 having TML system 804. TML system 804 has a total monetary liability 803 and a total monetary liability limit 805. Account 802 has subscribers 806 and 808 directly associated to account 802.

Subscriber 806 has a subscriber offer 810, which dictates the terms, conditions, and rates for usage by subscriber 806. Subscriber offer 810 also establishes subscriber balance 814. Subscriber balance 814 is available to be used to pay for goods and services by subscriber 810 only. Subscriber 808 has a subscriber offer 812, which dictates the terms, conditions, and rates for usage by subscriber 808. Subscriber offer 812 also establishes subscriber balance 816. Subscriber balance 816 is available to be used to pay for goods and services by subscriber 808 only.

Account 802 has an account 822 that is a sub account directly associated to account 802. Account 822 has TML system 824. TML system 824 has a total monetary liability 823 and a total monetary liability limit 825. Account 822 has subscribers 826 and 832 directly associated to account 822. TML system 824 has scope 840 that includes account 822 and subscribers 826 and 832 directly associated to account 822. Total monetary liability limit 825 limits a liability of account 822 and subscribers 826 and 832.

Subscriber 826 has a subscriber offer 828, which dictates the terms, conditions, and rates for usage by subscriber 826. Subscriber offer 828 also establishes subscriber balance 830. Subscriber balance 830 is available to be used to pay for goods and services by subscriber 826 only. Subscriber 832 has a subscriber offer 834, which dictates the terms, conditions, and rates for usage by subscriber 832. Subscriber offer 834 also establishes subscriber balance 836. Subscriber balance 836 is available to be used to pay for goods and services by subscriber 832 only.

TML system 804 has a scope 818 that includes account 802 and account 822 so that total monetary liability 803 overlaps total monetary liability 823. In scenarios with overlapping total monetary liabilities, the minimum of the available TMLs of all applicable total monetary liabilities is used. The effect of this is that anything that affects total monetary liability 823 will also affect total monetary liability 803 (but not vice-versa). Total monetary liability 803 can limit spending or liability contributed by in account 822.

Below is an example of configuration 800 described in the context of a mobile telephone communication service, the techniques described herein are not limited as such, but instead could be employed in the context of other services, such as a data communication service.

TABLE 2

Balances and Total Monetary Liability affected by usage charges and the limit of Total Monetary Liability Limit on Balances.

| # | Event | Total Monetary Liability 803 | | Balance 814 | | Balance 816 | | Total Monetary Liability 823 | | Balance 830 | | Balance 836 | |
|---|---|---|---|---|---|---|---|---|---|---|---|---|---|
| | | Value | Available Value | Value | Available Value | Value | Available Value | Value | Available Value | Value | Available Value | Value | Available Value |
| 1 | Starting conditions | 0 | 500 | 300 | 300 | 300 | 300 | 0 | 200 | 150 | 150 | 175 | 175 |
| 2 | Subscriber 806 purchases $120 item | 120 | 380 | 180 | 180 | 300 | 300 | 0 | 200 | 150 | 150 | 175 | 175 |
| 3 | Subscriber 834 purchases $140 item | 260 | 240 | 180 | 180 | 300 | 240 | 140 | 60 | 150 | 60 | 35 | 35 |
| 4 | Subscriber 808 purchases $200 item | 460 | 40 | 180 | 40 | 100 | 40 | 140 | 40 | 150 | 40 | 35 | 35 |
| 5 | Payment of $50 made to Account 824 | 410 | 90 | 180 | 90 | 100 | 90 | 90 | 90 | 150 | 90 | 35 | 35 |

Row 1 of Table 2 represents starting conditions. Row 2 of Table 2 represents when subscriber 806, who is part of account 802, makes a $120 purchase that directly affects total monetary liability 803 and balance 814, but does not affect any of the other balances, or total monetary liability 823. Row 3 of Table 2 represents when subscriber 832, who is part of account 822, makes a $140 purchase that not only directly affects total monetary liability 823, the $140 purchase also directly affects total monetary liability 803. Since total monetary liability 803 only has $240 remaining, total monetary liability 803 limits an availability of balance 816 to $240. Since total monetary liability 823 only has $60 remaining, total monetary liability 823 limits an availability of balance 826 to $60. Row 4 of Table 2 represents when subscriber 808, who is part of account 802, makes a $200 purchase. The $200 purchase directly affects total monetary liability 803, and balance 816. Since total monetary liability 803 only has $40 remaining, total monetary liability 803 limits the availability of balance 814, balance 816, and balance 830 to $40. Row 5 of Table 2 represents when a payment of $50 is made to account 822 that directly affects total monetary liability 823. However, the payment of $50 does not immediately make any more funds available to any of accounts 802 and 822 or balances 814, 816, 830 and 836, as they are limited due to the fact that total monetary liability 803 has less available funds than total monetary liability 823.

Advantageously, balances 814, 816, 830 and 836 may support concurrent usage as well, ensuring that even with multiple simultaneous events affecting total monetary liabilities 803 and 823 (e.g. multiple subscribers within the account performing simultaneous usage), accounts 802 and 822 do not exceed total monetary liability limits 805 and 825. That is, just as balances 814, 816, 830 and 836 can use reservations and balance nibbling to support simultaneous consumption from the same balance, TML amounts can be reserved. For example, a subscriber has a single balance with $10. The subscriber wants to make a phone call that is charged $1.00 per minute. Based on the $10 of available balance, the subscriber could potentially make a 10-minute phone call before running out of funds. However, it is possible that while making this call, the subscriber could perform additional activities, such as starting a data session, or maybe even making a second call, for example, as part of a three-way call. If the subscriber were to make the second call, for example, at the same rate of $1.00 per minute, then the subscriber does not have enough funds for the first call to be 10-minutes, and the second call to be 10-minutes, as this would be a total charge of $20.00, and the single balance is only has $10. A portion of the available $10.00 may be reserved (a "nibble" of the balance) when the first call is made, and dedicate the portion to the first call. A size of the nibble or portion reserved is configurable. In this example, a reservation of $3.00 may be made, so that $7.00 is remaining for any other usage. If the first call goes beyond 3-minutes (fully consumes the $3.00 reservation), a second reservation (assuming there are available funds) to extend the first call for another few minutes may be made. Note that if during the first 3-minutes the subscriber made the second call at $1.00 per minute, a second reservation for $3.00 may be made, meaning that there was $3.00 reserved for the first call, and $3.00 reserved for the second call, and $4.00 remaining for other usage. When the usage ends, a "reconcile" of the portions reserved may be made, meaning that there is a charge for the used portion and a return of any unused portion to the balance. If the first call only lasted 2-minutes, there would be a charge $2.00, and a return $1.00 to the single balance. This is reserving and balance nibbling. When it comes to a TML system, the same reserving and balance nibbling may be performed. For example, if a reserve of $3.00 from the single balance is made, a reserve of $3.00 is also made in the total monetary liability in the TML system.

The TML system may trigger internal and external actions. Based on a value of the total monetary liability, and a relationship to the total monetary liability limit, another function around total monetary liability is a capability to trigger internal and external actions. One action is sending a message to an account owner or subscriber when the total monetary liability reaches the total monetary liability limit, and when the total monetary liability goes below the total monetary liability limit. That is, to inform an account owner that the account has reached a maximum allowed liability, so that the owner is aware that no more goods or services may be purchased until the owner takes some action (e.g. make a payment), and inform the owner that total monetary liability has been reduced below the total monetary liability limit, and that the account may now purchase goods and services.

The TML system can be used to trigger other internal and external actions as well. For example, when the total monetary liability reaches the total monetary liability limit, the merchant or source might want to trigger a credit watch on the account, or perform some sort of other specialized business process to the account. Additionally, in many applications such as telecommunication services, individual goods and services are turned on/off for particular entities (e.g. accounts or subscribers) by configuring specific network elements to allow/inhibit a particular entity from using a particular service, or purchasing a particular item. The total monetary liability reaching the total monetary liability limit could be used to trigger provisioning of these external network elements to deny authorization for an account, and all subscribers of the account. Similarly, when the total monetary liability is reduced from the total monetary liability limit (e.g. a payment is made), external network elements could be configured to allow usage for this account, and all subscribers of the account.

Figure 9:
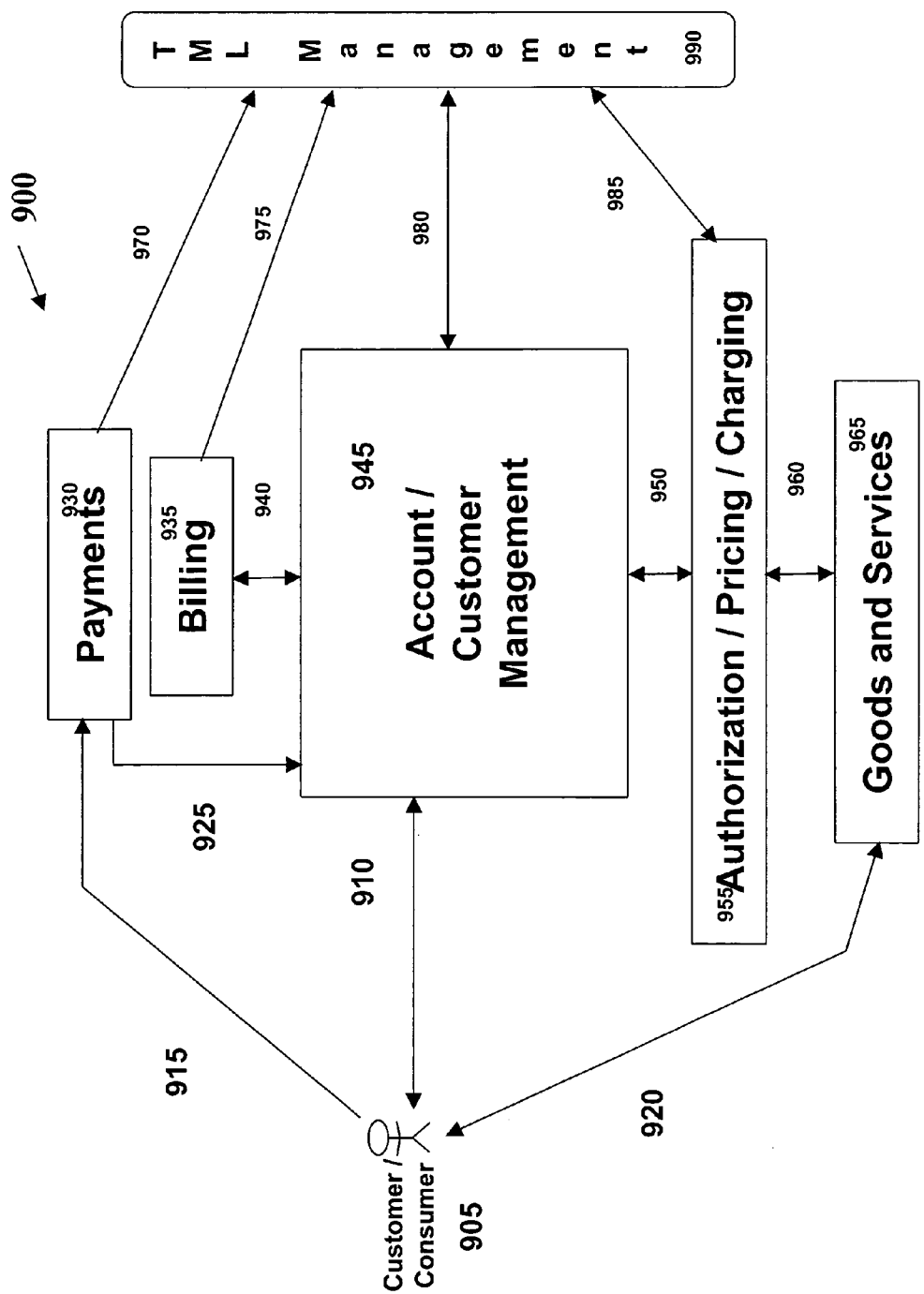
FIG. 9 is a block diagram of a sample configuration of a service provider system including a total monetary liability system.

FIG. 9 is a sample configuration of a service provider system including a TML system, designated as configuration 900. Configuration 900 includes customer/consumer 905, payments 930, billing 935, account/customer management system 945, authorization/pricing/charging 955, goods and services 965, and TML management system 990.

Customer/consumer 905 purchases 920 goods and services 965. Before being able to make purchases or use any goods and services 965, customer/consumer 905 sets up an account with a merchant or source, which specifies what goods and services may be purchased, prices for these goods and services 965, payment terms, and anything else needed to manage/interact with customer/consumer 905.

Account/customer management system 945 is used to acquire and manage customers. Account/customer management system 945 records all terms and conditions of an agreement between customer/consumer 905 and merchant and controls and keeps records of all purchases and interactions with customer/consumer 905. Account/customer management system 945 is where account information of customer/consumer 905 is stored, which not only includes the agreement with respect to the prices of goods and services 965, but also includes running totals of usage of the goods and services 965 by customer/consumer 905 to date (kept in balances), and available credit.

Authorization/pricing/charging 955 controls what goods and service the account and associated customers are allowed to consume, based on the agreements between the merchant and the customer, as well as well as logic to price and charge each consumption. Whether or not the consumption is allowed, as well as the how it is priced and charged, is dependent on many factors, including agreements between customer/consumer 905 and the merchant, current running totals, and total monetary liability of customer/consumer 905. Also authorization/pricing/charging 955 supports real time authorization or authorization during usage by customer/consumer 905, allowing for usage and services by the account and/or customers in the account to be rejected or stopped as soon as the account and/or customer reaches certain conditions (like exhausting available funds, reaching the account credit limit, etc.). For example, if the customer is purchasing phone service, and is paying one dollar per minute authorization/pricing/charging 955 can terminate the call mid-session as soon as the customer exhausts his available credit.

Account/customer management system 945 passes 950 account information to authorization/pricing/charging 955, including current subscriptions and account balance values, so that authorization/pricing/charging 955 can determine if the usage should be allowed, and how to price and charge the usage. In turn, authorization/pricing/charging 955 passes back 950 records of the usage, including associated pricing and charging, allowing account/customer management system 945 to record the usage, and update the balances accordingly.

Goods and services 965 are offered by the merchant, and consumed by customer/consumer 905. Goods and services 965 could be simple transactions, like buying a can of soda, or more complex services, like purchasing telecommunications services, which includes monthly charges, as well as individual charges for each usage within the month. When a customer attempts to performs a usage action, goods and services 965 notifies 960 authorization/pricing/charging 955 of customer/consumer 905 and what usage is being attempted, and is authorization/pricing/charging 955 ultimately responds to authorize/deny the usage. If the usage is authorized, authorization/pricing/charging 955 also specifies for how long the usage is allowed (e.g. maximum number of bytes allowed in a data session, maximum duration of a phone call, etc.).

Billing 935 is a process by which the merchant sums up any unpaid charges, and presents the sum to the customer, with the expectation that the customer would respond with a payment. Billing 935 could add or remove charges. For example, billing 935 may add monthly recurring charges, or reduce charges by applying volume discounts or promotions. Any additional charges added or removed by billing 935, is reflected in the running totals kept in account/customer management system 945, including total monetary liability. Account/customer management system 945 passes 940 usage and other account-specific information to billing 935, so that billing 935 performs the proper billing action on the account. In turn, billing 935 passes back 940 information to account/customer management system 945, including the invoice itself, as well as any new or adjusted charges. Account/customer management system 945 keeps the information for historical purposes, and also adjusts any running balances based on new or adjusted charges from billing 935. Billing 935 may add or remove charges to the account. The additions or subtractions by billing 935 to the account are passed 975 to TML management system 990 so that the total monetary liability may be updated.

Payments 930 by customer/consumer 905 to the merchant are typically based on bills/invoices received. Any payments received are typically shown on the bills/invoices, and reflected 970 in the total monetary liability of TML management system 990. When a payment 930 is made, the information of payment 930 is passed to TML Management system 990 so that total monetary liability may be updated. Customer/consumer 905 can make payments 915 towards his accounts, via financial institutions like banks, credit/debit cards, cash, or any other accepted payment method.

Payments 930 are recorded 925 in account/customer management system 945 for historical purposes, so that this information can be viewed by customer/consumer 905 on-demand, or as part of an invoice. Additionally, account/customer management system 945 applies payment 930 towards the account, performing the appropriate accounting logic (E.g. updating A/R balances), and update the account status according to prescribed business rules. For example, if the account was in arrears, causing the account to have limited or restricted usage, payment 930 may cause these restrictions/limitations to be restricted. Similarly, account/customer management system 945 rewards the account for payment 930, giving additional services or reduced process for existing services.

TML management system 990 includes a running total of an amount of money owed by the account or funds consumed by customer/consumer 905 to the merchant or total monetary liability. Debits (e.g. charges) to the account increase the total monetary liability, while credits (e.g. payments) decrement the total monetary liability. The TML management system 990 includes updating of the total monetary liability based on credits and debits to the account.

Associated with each total monetary liability is a total monetary liability limit, which can be a value set by the merchant. When the account's total monetary liability reaches the total monetary liability limit, the account may be prohibited from accruing any additional charges until a payment is received to reduce the total monetary liability below the total monetary liability limit. The merchant may set the total monetary liability limit to a customer defined value, typically if the total monetary liability limit defined by the customer is less that a the total monetary liability limit that the merchant would impose.

Account/customer management system 945 may control the total monetary liability limit, so the total monetary liability limit information is passed 980 to TML Management system 990. Additionally, account/customer management system 945 may make financial adjustments to the account, such as refunding charges, correcting erroneous charges, and the like. This information is passed 980 to TML Management system 990 as well, again so the total monetary liability may be updated. The total monetary liability is passed 980 from TML Management system 990 to Account management, so that the total monetary liability can be presented to customer/consumer 905.

Authorization/pricing/charging 950 uses the total monetary liability as part of an authorization process. The authorization process denies usage that will cause the total monetary liability to exceed the total monetary liability limit. Authorization/pricing/charging 950 passes 985 charging information related to usage to TML Management system 990, so that the total monetary liability can be updated with the usage charges.

Customer/consumer 905 interacts 910 with account/customer management system 945 to create and modify accounts, add/remove services, get account history, get running balance and TML values, question charges, make complaints, and the like. Account/customer management system 945 responds to customer/consumer 905 requests, as well as initiating contact to customer/consumer with information about promotions, low balance/low credit warnings, and the like. These contacts could be through a customer service representative or via self-service kiosks, automated voice systems, telephone calls, text messages, e-mails, and analogous contacts. Once customer/consumer 905 has created an account, goods and services 965 may be purchased 920.

Figure 10:
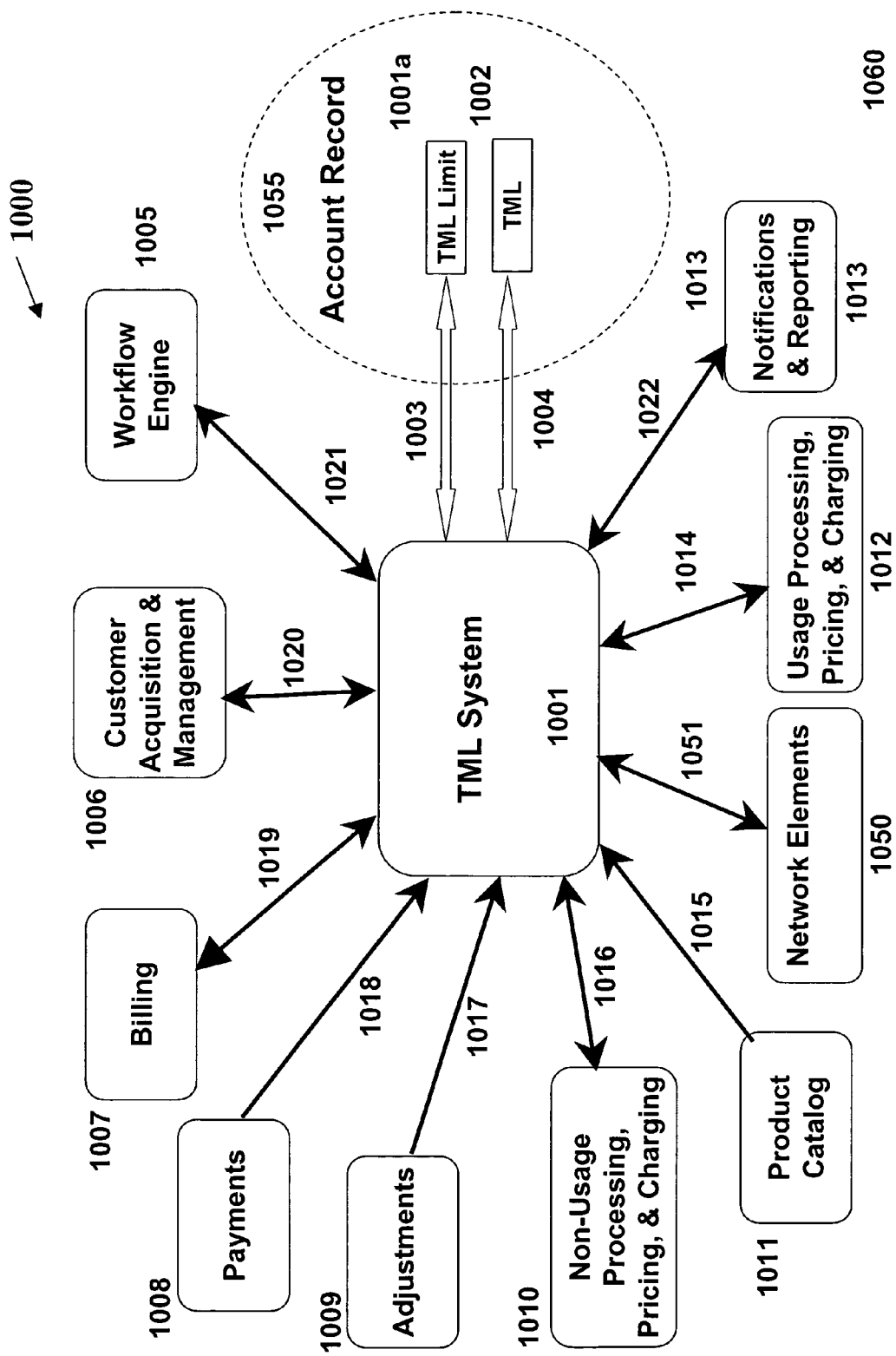
FIG. 10 is a block diagram of a sample configuration of a total monetary liability system and items that can affect the total monetary liability system.

FIG. 10 is a sample configuration of a TML system 1001 and items that can affect TML system 1001.

TML system 1001 acts as the interface between various components, and a control 1004 of a total monetary liability 1002 of TML system 1001 and a control 1003 of a total monetary liability limit 1001a, reside in an Account Record 1055.

A workflow Engine 1005, using an interface 1021, can turn TML system 1001 on and off for an account, can set/modify total monetary liability limit 1001a, can modify total monetary liability 1002, and can initiate actions based on a current value of total monetary liability 1002.

A customer acquisition and management 1006, using an interface 1020, can turn TML system 1001 on and off for an account, can set/modify total monetary liability limit 1001a, can modify total monetary liability 1002, and can report a current total monetary liability 1002.

Billing 1007, via an interface 1019, can initiate adjustments to total monetary liability 1002, applying credits (decreasing total monetary liability 1002) based on billing discounts, and debits (increasing total monetary liability 1002) based on additional charges. Additionally billing can access a current value of total monetary liability 1002 to be displayed on an invoice. TML systems can overlap and it is possible that a single change could affect multiple TML systems.

Payments 1008 via an interface 1018, can initiate credit adjustments to total monetary liability 1002 as payments are received on the account. Scopes of TML systems can overlap, so it is possible that a single payment could affect multiple TML systems.

Adjustments 1009 via an interface 1017, on behalf of the account, or any subscribers within the account, can initiate credit adjustments to total monetary liability 1002 as adjustments (e.g. refunds) are received on the account. Scopes of TML systems can overlap, so it is possible that a single adjustment could affect multiple TML systems.

Non-Usage Processing and Charging 1010, via an interface 1016, on behalf of the account or any subscribers within the account, can initiate adjustments, debits and credits, to total monetary liability 1002 as adjustments as non-usage charges and credits are awarded to the account, or to any subscribers within the scope of the TML. Scopes of TML systems can overlap, so it is possible that a single non-usage charge or credit could affect multiple TML systems. Additionally, non-usage charges may be prohibited or limited, so that total monetary liability 1002 does not exceed total monetary liability limit 1001a.

A product Catalog 1011, via an interface 1015, can affect TML system 1001 by setting default total monetary liability limit 1001a values, which can be used, or overridden.

Usage processing, pricing, and charging 1012, via interface 1014, on behalf of the account or any subscribers within the account, can initiate adjustments, debits and credits, to total monetary liability 1002 value as adjustments as non-usage charges and credits are awarded to the account, or to any subscribers within the scope of TML system 1001. Scopes of TML systems can overlap, so it is possible that a single non-usage charge or credit could affect multiple TML systems. Additionally, usage may be prohibited or limited, so that total monetary liability 1002 does not exceed a configured total monetary liability limit 1001a.

Network elements 1050, via interface 1051, can be used as part of the usage authorization process. For example, when the TML limit has been reached, network elements can be provisioned to disallow goods and services. Similarly, when the TML is reduced from the TML limit, network elements can be provisioned to allow foods and services.

Notifications and reporting 1013 via an interface 1022, can report on values of total monetary liability 1002, and initiate actions in real-time based on the relationship between total monetary liability 1002, and a configured total monetary liability limit 1001a. The running TML value can be reported at any time by whatever reporting mechanisms are supported by the merchant, including IVR (integrated voice response), SMS text messages, ussd (Unstructured Supplementary Services Data) text messages, e-mails, internet web portals, and the like.

Figure 11:
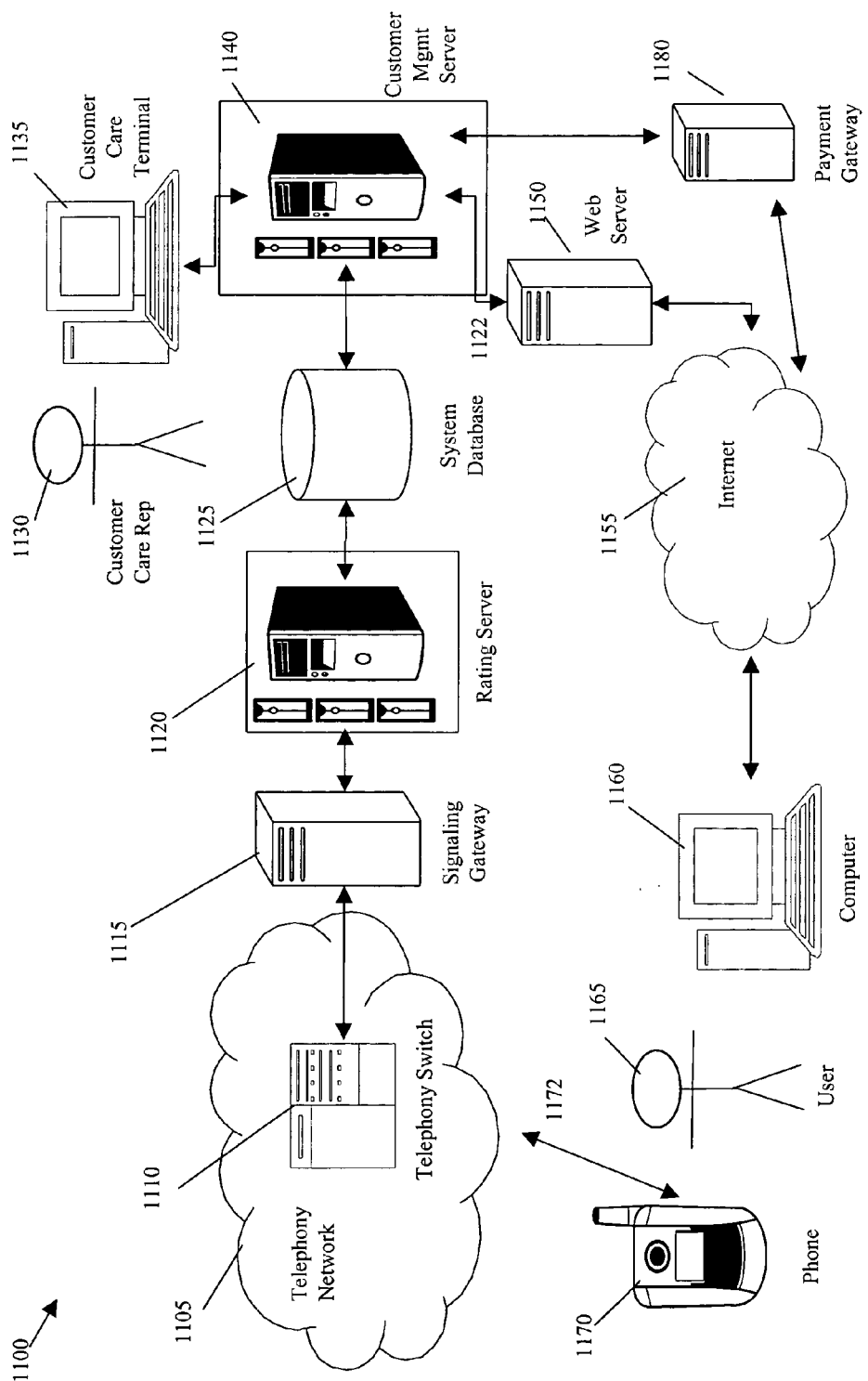
FIG. 11 is a block diagram of a communication system that includes a rating server for administrating the total monetary liability system.

FIG. 11 shows a communication system 1100 that includes a server, i.e., a rating server 1020, for administrating the TML system. Communications system 1100 includes a telephony network 1105, a signaling gateway 1115, rating server 1020, a system database 1125, a customer management server 1140, and a customer care terminal 1135. Communications system 1100 also includes a web server 1150 coupled to the Internet 1155.

User 1165 purchases mobile handset 1170 from a mobile service provider [not shown]. Handset 1170 communicates via a mobile telephony network 1105, a component of which is switch 1110. Switch 1110 is configured to notify signaling gateway 1115 of any network events related to subscribers stored on system database 1125. For example, call offered, call answered, and call disconnected are three types of events for which signaling gateway 1115 would receive notification.

Signaling gateway 1115 in turn passes events to one or more Rating Servers 1120. Rating Servers 1120 run software which, among other rating calculations, total monetary liability, and factors total monetary liability into its calculations. As a result of these calculations, Rating Servers 1120 will communicate back through Signaling Gateway 1115 to switch 1110, advising of conditions on account of user 1165, which may limit activities of user 1165, such as, for example, low balance conditions, an available TML, and when the total monetary liability is equal to or exceeds the total monetary liability limit. Switch 1110 is able to act on advice from Rating Server 1120 and affect call of user 1165, either by disconnecting, denying or changing the quality of service. This scenario describes a real-time rating and authorization capability or a rating and authorization capability, where usage is allowed or denied based on calculations which are performed in sequence with the network events.

As charges for usage are calculated and applied, system database 1125 is updated accordingly. Customer Management Server 1140 is connected to system database 1125 and provides administrative capabilities to clients such as Customer Care Terminal 1135 and Web Server 1150. Customer Service Representative 1130 can use Customer Care Terminal 1135 to inform user 1165 about details of user's account, and make any changes at a request of user 1165. User 1165 can also manage their own account through their personal computer 1160, which is connected through public internet 1155 to Web Server 1150.

As payments are made and applied, system database 1125 is updated, including total monetary liability. For example, User 1165, via computer 1160 connected to internet 1155 makes a payment though payment gateway 1180. Payment is processed in customer management server 1140, which includes updating the users information, including total monetary liability, in system database 1125.

User 1165 could also make payment via customer service representative 1130, who would enter payment on customer care terminal 1135, which would process the payment request, and via internal application programming interfaces, request payment from payment gateway 1180. Payment gateway 1180 would validate request, then send payment information back to customer management server 1140, which would process the payment, including updating the users information, including total monetary liability, in system database 1125.

Figure 12:
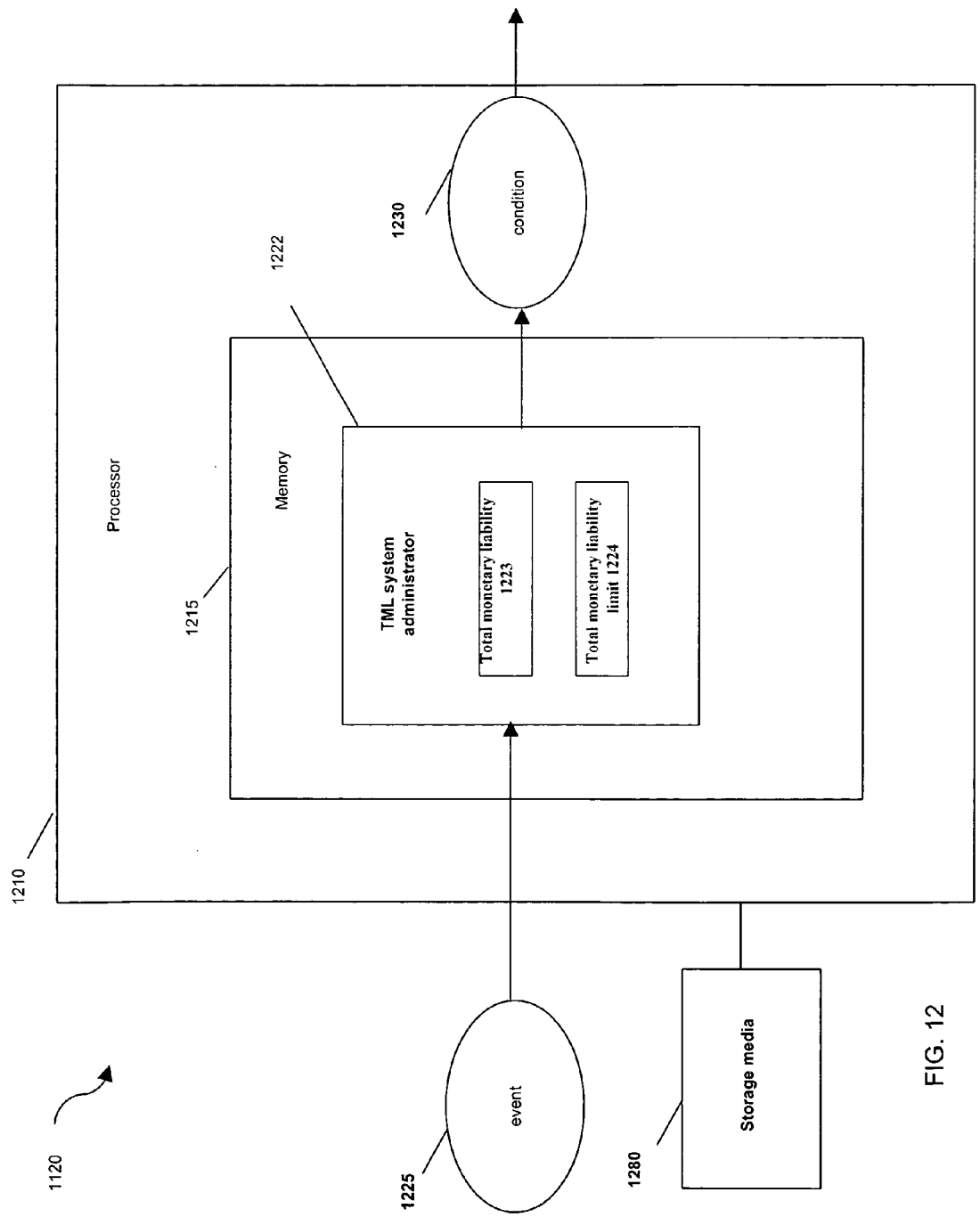
FIG. 12 is a block diagram of the rating server of FIG. 11.

FIG. 12 shows rating server 1120. Rating server 1120 includes a processor 1210 and a memory 1215. Memory 1215, in turn, includes a TML system administrator 1222, that contains instructions that are readable by processor 1210 to cause processor 1210 to perform the activities described in the context of FIGS. 1-11, and further described below.

Processor 1210 performs operations of a TML system administrator 1222. TML system administrator 1222 obtains a total monetary liability limit 1224 indicative of an available funding for each account. TML system administrator 1222 also maintains a total monetary liability 1223 that is a running total that includes a sum of the amount of liability contributed by subscriber 765 during a provision of a service to subscriber 765 and any other amount of liability contributed by another subscriber during a provision of a service to the other subscriber, for example if the subscriber is in the same account or in an account with in the same scope as subscriber 765.

TML system administrator 1222 receives a communication, i.e., event 1225, indicative of an event concerning a call being made by subscriber 765 (e.g., call offered, call answered, or call disconnected). TML system administrator 1222 may determine if total monetary liability 1223 exceeds total monetary liability limit 1224. If total monetary liability 1223 exceeds total monetary liability limit 1224, TML system administrator 1222 issues or outputs a communication, i.e., a condition 1230, indicative of a condition of user 765's account. TML system administrator 1222 may also determine whether an amount of liability contributed by subscriber 765 during a provision of a service to subscriber 765 exceeds a balance indicative of a portion of the available funding that may be consumed by subscriber 765. TML system administrator 1222 may also determine whether another amount of liability contributed by another subscriber during a provision of a service to the other subscriber exceeds a balance indicative of a portion of the available funding that may be consumed by the subscriber. If the amount of liability contributed by subscriber 765 during the provision of a service to subscriber 765 exceeds a balance indicative of the portion of the available funding that may be consumed by subscriber 765, TML system administrator issues or outputs a communication, i.e., a condition 1230, indicative of a condition of user 765's account. TML system administrator 1222 may also determine an available TML that equals an amount of total monetary liability 1223 below total monetary limit 1224. The available TML is indicative of a portion of the available funding that may be consumed by the subscriber 765, TML system administrator issues or outputs a communication, i.e., a condition 1230, indicative of a condition of user 765's account, namely the available TML, for example, to a network indicating that a service can only be allowed for an amount that corresponds to the available TML, or indicating that subscriber 765 can only consume up to an amount that corresponds to the available TML, and the network is obligated to terminate service when this amount, for example, consumption level is reached.

Condition 1230 is communicated through signaling gateway 1115 to telephony switch 1110. Telephony switch 1110 acts on condition 1230 and affects user 765's call, either by disconnecting, denying or changing the quality of service at a time of condition 1230 or at a time that corresponds to the available TML of condition 1230.

As the call progresses, TML system administrator 1222 receives information about the call, e.g., duration of call, and accordingly, updates total monetary liability 1223 and the balance indicative of the portion of the available funding that may be consumed by the subscriber. If necessary, TML system administrator 1222 issues a subsequent condition 1230.

Rating server 1220 may be implemented in a general-purpose computer, for example, by a service provider or source, in which case, TML system administrator 1222 may be implemented in software as a program module. Alternatively, rating server 1220 may be implemented as an application-specific device in hardware or firmware, or a combination thereof. The term "module" is used herein to denote a functional operation that may be embodied either as a stand-alone component or as an integrated configuration of a plurality of sub-ordinate components.

Although TML system administrator 1222 is shown herein as being installed in memory 1215, TML system administrator 1222 can be tangibly embodied on an external computer-readable storage medium 1280 for subsequent loading into memory 1215. Storage medium 1280 can be any conventional storage medium, including, but not limited to, a floppy disk, a compact disk, a magnetic tape, a read only memory, or an optical storage medium. TML system administrator 1222 could also be embodied in a random access memory, or other type of electronic storage, located on a remote storage system and coupled to memory 1215.

The TML system advantageously allows an operator of the TML system to set the total monetary liability limit individually for each account, including accounts that have multiple members based on whatever criteria they decide (e.g. credit score). The TML system, as well as balances indicative of a portion of available funding that may be consumed by each subscriber, also advantageously prevents running up of excessive charges. Sources or service providers may support high-risk users (e.g. users with low credit scores) by keeping tight control on spending. A subscriber advantageously may determine at any moment in time, how much he owes the merchant or source through the total monetary liability and may limit the subscriber liability to the merchant.

Although FIGS. 1-12 are described in the context of a mobile telephone communication service, the techniques described herein are not limited as such, but instead could be employed in the context of other goods and/or services, such as a data communication service. Another exemplary service is a credit service, for example, two members of a sales department each having a credit card with an individual spending limit, and a shared limit. Accordingly, for an attempted credit transaction, a rating server similar to rating server 1120 would be employed to control a device to permit, deny or otherwise limit the transaction.

TABLE 3

| Term | Definition |
| --- | --- |
| Account | An entity that represents a customer of an operator/merchant. An account can be billable (for example, the liable party that owns the accounts receivable) or non billable. An account contains the subscriber profile details and can have associated subscribers and offers. An account can have one or more child accounts (organized in a hierarchy), as well as one or more subscribers and offers. An account can have zero or one account bundle. Accounts can have real-time balances and accumulators. |
| account hierarchy | A set of parent and child accounts often representing a set of departments in a single corporate entity. |
| account offer | An account offer is a sellable entity that can be associated only to an account and is used to provision account-level balances and account-level promotions to the account. Account offers can have associated recurring and non-recurring terms, contracts, and may optionally instantiate a total monetary liability and total monetary liability Limit. Account offers cannot contain usage items. It models a service that is consumed at the account level. Unlike a primary offer, an account offer is optional.<br>Note that an offer is a minimum sellable entity that can be delivered to an account or subscriber for the consumption of service. It is a collection of reusable building blocks that models its activity usage type, service, price, eligibility and dependencies with other offers, correlated resources, service payments, and consumed credits. Common types of offers are: primary offer, supplementary offer, account offer. |
| adjustment | A credit or debit that adjusts the amount of a specific charge or, in the case of a miscellaneous adjustment, adjusts the amount of an invoice or invoice-open-item. Typically, an adjustment is a one-time financial transaction (as opposed to the recurring aspect of a recurring charge) and a miscellaneous financial transaction (as opposed to the routine and expected charge of most non-recurring charges). An adjustment typically requires action by a customer service representative (CSR) or other employee. A credit adjustment normally credits back funds to the running balances that were originally debited by the charge.<br>Note: By contrast, a direct balance adjustment is a credit or debit to a running balance and has no explicit association with a charge. |
| Award | A rule that applies a monetary amount or non-monetary units to a balance. Sources for awards include voucher purchases, recharges, recurring charges, and bonus plans. The award is consumed in real time, through usage that occurs after the award has been granted. See also bonus. |
| Balance | A balance is a collection of funds of a similar unit type. Balances can be either (1) running (real-time authorization) balances or (2) financial (accounts receivable) balances. A balance is a representation of either a monetary or non-monetary (units-based) amount.<br>A balance can be either postpaid or prepaid. A postpaid balance can signify a unit amount, a monetary credit, or a spending limit, or the total amount due; all of which are incremented based upon user consumption activity. A real-time prepaid balance can represent the reserved holding of funds or units drawn from when a user consumes services. |

TABLE 3-continued

| Term | Definition |
| --- | --- |
| Balance Order | The order in which usage, recurring, and non-recurring charges are applied to the balances associated with the subscriber and accounts |
| Bonus | A promotion scheme that rewards a subscriber with discounts or awards based upon specific subscriber characteristics or upon achieving a certain threshold level of usage. See also award. |
| Charging | The process of modifying balances based on the calculated amounts for recurring charge terms, non-recurring charge terms, and usage. |
| Credit Limit | An operator-defined, cyclical balance limit, used to limit exposure on a postpaid balance. On a periodic basis, the balance is reset to this limit. If a balance reaches its minimum value (usually 0) during a cycle, then that balance cannot be used to authorize events until it is reset to the limit value at the start of the next cycle. Supported cycles include: Daily, Weekly, Monthly, Quarterly, Yearly, Bill Cycle, and None. |
| Customer Care Interface | The graphical user interface used to create and manage accounts, subscribers, and hierarchies. |
| Invoice | Cyclically generated or on-demand detailed listing of charges, taxes, and outstanding balance against an account, associated discounts or credits, and adjustments. Also includes invoice number, invoice date, total amount, and so on. Invoices can be generated and formatted for dispatch to customers. |
| Offer | An offer is a minimum sellable entity that can be delivered to an account or subscriber for the consumption of service. It is a collection of reusable building blocks that models its activity usage type, service, price, eligibility, and dependencies with other offers, correlated resources, service payments, and consumed credits. Common types of offers are primary offer, supplementary offer, and account offer. |
| non-recurring charge | A one-time charge, such as a returned check fee, installation fee, activation fee, termination fee, or equipment purchase. Can be applied at either the account or subscription level. |
| Payment | A payment is the transfer of money from one party (such as a person or company) to another. A payment is usually made in exchange for the provision of goods, services or both E.g. transfer of money from subscriber to communication service provider in exchange for the services and goods offered. |
| Payment Mode | Payment mode refers to the mode in which payment is made by the subscriber to the communications service provider. Payment can be made in Prepaid Mode or Postpaid mode. |
| Postpaid Balance | A postpaid balance signifies a unit amount, a monetary credit, or a spending limit, or the total amount due; all of which are incremented based upon user consumption activity. |
| Postpaid Payment Mode | Postpaid Payment mode refers to services paid for after use i.e. use and pay |
| Prepaid Balance | A prepaid balance represents the reserved holding of funds or units drawn from when a user consumes services. |
| Prepaid Payment Mode | Prepaid Payment mode refers to services paid for in advance i.e. pay and then use. |
| pricing | The Unified Rating Engine act of assigning an actual price to a usage, based on rates, duration, and so on. See also tariff. Another example of pricing is defining the price of a recurring charge term (with rating keys and rates). |
| Product Catalog | The Product Catalog is a system-provisioning data store for coherent and centralized management of market offerings. It supports multiple virtual service provider product definitions within a deployment and provides various paradigms for market segmentation and product pricing. |
| Real Time | Describes an activity or transaction that occurs during the rating and/or charging process, as opposed to waiting until the end of a cycle (bill time). Note that the "real-time" rating and/or charging process takes place, in most cases, during the actual duration of the usage event that is being rated and/or charged. |
| recurring charge | A charge assessed at regular intervals regardless of subscriber activity. Example: a monthly subscription fee. |
| Recurring/Non-Recurring Charge Server | The entity that generates recurring and non-recurring charges and applies them to subscriber balances. |
| service | Defines any kind of product sold. Services can be shared between different contract types. |
| Spending Limit | A user-definable (account-definable) cyclical limit on a balance, put in place to voluntarily control spending on a balance. A spending limit is used to limit exposure on a postpaid balance. Spending limits are reset cyclically and are not impacted by payments. |
| Statement | Cyclically generated or on-demand detailed listing of charges, taxes, and remaining balance against an account, associated discounts or and credits. Also includes statement number, statement date, statement amount, and so on. Statement can be generated and formatted for dispatch to customers. |

TABLE 3-continued

| Term | Definition |
| --- | --- |
| Subscriber | Subscriber refers to: (a) A person who uses the product or service (b) A specific service-delivery point for a product or service, for example, a telephone line, a login account for an online service, an end point in a leased line network. |
| Unified Rating Engine | Unified Rating Engine (URE) enables service providers to charge for all telecom services in real time and non-real-time, with complete real-time balance management for prepaid, postpaid, and hybrid customers. It has a flexible charging model that can adapt to evolving customer models with the ability to limit overall customer liabilities for reduced financial risk. It enables real-time and deferred promotions, with cross-product discounting to create innovative marketing offers for penetrating new customer segments and reducing churn. It supports many rating features to meet a wide range of requirements from the wireline, mobile, cable, and Internet broadband industries. |
| Ussd | Unstructured Supplementary Service Data is a capability of certain mobile telephones, typically involvingeal-time or instant messaging type phone services |

The techniques described herein are exemplary, and should not be construed as implying any particular limitation on the present disclosure. Also, steps associated with the processes described herein can be performed in any order, unless otherwise specified or dictated by the steps themselves. It should be understood that various alternatives, combinations and modifications could be devised by those skilled in the art. The present disclosure is intended to embrace all such alternatives, modifications and variances that fall within the scope of the appended claims.

What is claimed is:

1. A method performed by a processor in accordance with instructions that said processor read from a memory, comprising:
   obtaining a liability limit indicative of an available funding;
   determining whether a first amount of liability contributed by a first subscriber during a provision of a service to said first subscriber exceeds a first balance indicative of a first portion of said available funding that may be consumed by said first subscriber;
   determining whether a second amount of liability contributed by a second subscriber during a provision of a service to said second subscriber exceeds a second balance indicative of a second portion of said available funding that may be consumed by said second subscriber;
   issuing a first communication to a device to affect said provision of a service to said first subscriber if said first amount of liability exceeds said first balance;
   issuing a second communication to said device to affect said provision of a service to said second subscriber if said second amount of liability exceeds said second balance;
   maintaining a running total that includes a sum of said first amount of liability and said second amount of liability;
   determining whether said running total exceeds said liability limit; and
   reducing said running total, wherein said reducing does not change said first amount of liability or said second amount of liability.

2. The method of claim 1,
   wherein said first communication causes said device to inhibit said provision of a service to said first subscriber, and
   wherein said second communication causes said device to inhibit said provision of a service to said second subscriber.

3. The method of claim 1, further comprising:
   issuing a third communication to said device to affect said provision of a service to said first subscriber and said provision of a service to said second subscriber, if said running total exceeds said liability limit.

4. The method of claim 3, wherein said third communication causes said device to inhibit said provision of a service to said first subscriber and said provision of a service to said second subscriber.

5. A system comprising:
   a processor; and
   a memory that contains instructions that control said processor to cause said processor to perform actions of:
      obtaining a liability limit indicative of an available funding;
      determining whether a first amount of liability contributed by a first subscriber during a provision of a service to said first subscriber exceeds a first balance indicative of a first portion of said available funding that may be consumed by said first subscriber;
      determining whether a second amount of liability contributed by a second subscriber during a provision of a service to said second subscriber exceeds a second balance indicative of a second portion of said available funding that may be consumed by said second subscriber;
      issuing a first communication to a device to affect said provision of a service to said first subscriber if said first amount of liability exceeds said first balance;
      issuing a second communication to said device to affect said provision of a service to said second subscriber if said second amount of liability exceeds said second balance;
      maintaining a running total that includes a sum of said first amount of liability and said second amount of liability,
      determining whether said running total exceeds said liability limit; and
      reducing said running total, wherein said reducing does not change said first amount of liability or said second amount of liability.

6. The system of claim 5,
   wherein said first communication causes said device to inhibit said provision of a service to said first subscriber, and wherein said second communication causes said device to inhibit said provision of a service to said second subscriber.

7. The system of claim 5, further comprising:
issuing a third communication to said device to affect said provision of a service to said first subscriber and said provision of a service to said second subscriber, if said running total exceeds said liability limit.

8. The system of claim 7, wherein said third communication causes said device to inhibit said provision of a service to said first subscriber and said provision of a service to said second subscriber.

9. A non-transitory storage medium comprising instructions tangibly embodied thereon, wherein said instructions are readable by a processor, and cause said processor to perform actions of:
obtaining a liability limit indicative of an available funding;
determining whether a first amount of liability contributed by a first subscriber during a provision of a service to said first subscriber exceeds a first balance indicative of a first portion of said available funding that may be consumed by said first subscriber;
determining whether a second amount of liability contributed by a second subscriber during a provision of a service to said second subscriber exceeds a second balance indicative of a second portion of said available funding that may be consumed by said second subscriber;
issuing a first communication to a device to affect said provision of a service to said first subscriber if said first amount of liability exceeds said first balance;
issuing a second communication to said device to affect said provision of a service to said second subscriber if said second amount of liability exceeds said second balance;
maintaining a running total that includes a sum of said first amount of liability and said second amount of liability,
determining whether said running total exceeds said liability limit; and
reducing said running total, and wherein said reducing does not change said first amount of liability or said second amount of liability.

10. The storage medium of claim 9,
wherein said first communication causes said device to inhibit said provision of a service to said first subscriber, and
wherein said second communication causes said device to inhibit said provision of a service to said second subscriber.

11. The storage medium of claim 9, further comprising:
issuing a third communication to said device to affect said provision of a service to said first subscriber and said provision of a service to said second subscriber, if said running total exceeds said liability limit.

12. The storage medium of claim 11, wherein said third communication causes said device to inhibit said provision of a service to said first subscriber and said provision of a service to said second subscriber.

* * * * *